United States Patent [19]

Chung

[11] 4,177,462
[45] Dec. 4, 1979

[54] COMPUTER CONTROL OF TELEVISION RECEIVER DISPLAY

[75] Inventor: David H. Chung, Palo Alto, Calif.

[73] Assignee: Umtech, Inc., Palo Alto, Calif.

[21] Appl. No.: 755,749

[22] Filed: Dec. 30, 1976

[51] Int. Cl.² .............................................. G06F 3/14
[52] U.S. Cl. .................................. 340/703; 340/723;
340/750; 358/93; 273/85 G
[58] Field of Search ....... 340/324 A, 324 AD, 152 R,
340/154, 747, 750, 703, 723; 358/93; 273/DIG.
28, 85 G

[56] References Cited

U.S. PATENT DOCUMENTS

| | | | |
|---|---|---|---|
| 3,829,095 | 8/1974 | Baer | 340/324 AD |
| 3,895,374 | 7/1975 | Williams | 340/324 AD |
| 3,928,845 | 12/1975 | Clark | 340/324 AD |
| 3,996,583 | 12/1976 | Hutt et al. | 340/324 AD |
| 4,052,719 | 10/1977 | Hutt et al. | 340/152 R |

Primary Examiner—Marshall M. Curtis
Attorney, Agent, or Firm—C. Michael Zimmerman

[57] ABSTRACT

A method and apparatus for generating, under the control of a microprocessor, signals for operating a visual display mechanism of the scanning type. The position of the scan is tracked, and when it approaches a desired location on the display area for a particular segment to be displayed, it responds thereto by directing delivery to the scanning system of control signals which define the selected display segment. A plurality of display segments, each containing information at least partially defining one or more object images which it may be desired to be included in a specified display, are stored in a cartridge memory which can also include specific operating instructions for carrying out a particular game or other function with such display segments. Each of the display composers includes an associative memory arrangement for addressing the cartridge memory and directing feedout therefrom of specified segments at times required during the scan. A FIFO buffer is also included in each of the display composers for delivering information defining an object image at a regular rate correlated to the scanning rate, irrespective of the time in which such information is made ready for the display.

22 Claims, 2 Drawing Figures

COMPUTER CONTROL OF TELEVISION RECEIVER DISPLAY

BACKGROUND OF THE INVENTION

This invention relates to the production of control signals for operating a visual display mechanism of the scanning type, such as a standard television receiver, and, more particularly, to a method and apparatus for inexpensively producing scanning control signals which provide a high resolution display and can be easily changed from display to display. The invention accomplishes this by composing under the control of a microprocessor each frame of a display substantially simultaneously with the time the display surface is being scanned to produce the same.

Until recently, standard television receivers of the type found in homes and places of congregation throughout the developed countries have been passive elements. That is, standard television receivers are used traditionally only to display programming transmitted to the same from an image pick up device, such as a camera. Television receiver control units are now available, however, which turn TV receivers themselves into active instrumentalities, i.e., instrumentalities in which the viewer can directly control or influence the actual display which is on the receiver screen at a given time. Such control units are typically designed for use of the television receiver as a game display, such as a display of a modified version of the game of ping-pong. The viewer becomes a participant in such a game by manipulating the screen display, which display may be programmed to react to the control in a particular way. For example, in the modified game of ping-pong the viewer or participant can move a paddle on the screen to intercept a ball. The ball will react to the interception by "bouncing" from the paddle with an appropriate deflection angle.

There are basically two different kinds of TV receiver control units of the game type. One is the so-called hard-wired type which includes specific logic designed to perform a particular function, such as play a particular game. Hard wired control units are quite limited in their use. That is, not only are such units limited to specific games, economics limits the same to quite simple games. Moreover, the amount of hardware required to provide a highly resolved visual display with multiple movements on TV receiver is more than what can be provided economically.

The other type of control unit now available utilizes a microprocessor as a primary component in order to gain the versatility inherent in such a device. Presently available ones, however, do not take full advantage of the resolution, color and movement capabilities of standard television receivers. For example, each frame of TV receivers built in accordance with the NTSC scanning standards adopted in the United States and Japan will be made up of 483 individual horizontal scan lines. Each scan line includes about 320 individual display points, each one of which can be individually defined. This means that on a standard 19 inch television screen, "dots" which are only about 47 mils apart, center-to-center, can be individually programmed to obtain good resolution.

The approach taken by most microprocessor-based control units now available is to duplicate or, in other words, "map" in a memory information defining a frame which is to be displayed, which information is then read out to the television receiver to control its display. It will be recognized that an inordinate and quite expensive amount of memory would be required to individually specify in the "map" different information for each one of the "dots" which individually can be generated by a TV scanning system. This is particularly true if a color display is generated. The information needed to specify each of the dots then must include color information, as well as intensity information. Because of this, it is the practice now to generate much larger, single color dots to make up a display, with the concommitant result that the resolution is likewise reduced.

The memory mapping concept now used to define the frames of a display results in another major limitation on presently available devices using microprocessors. Any appreciable object movement between frames requires that the content of the memory be altered, copied, exchanged or deleted. Thus, the step of moving an object in the display can be quite demanding on a microprocessor and is awkward to execute, particularly in the relatively short time, about 1.3 milliseconds, between fields.

SUMMARY OF THE INVENTION

The present invention provides methods and apparatuses for coupling a microprocessor to a scanning visual display apparatus which enables a highly resolved display to be obtained without inordinate memory requirements. It further enables display of complex object movements without straining the microprocessor. The invention accomplishes this by substituting for the present memory mapping concept now used in microprocessor-based controllers, the concept of composing substantially simultaneously with each scan the information which is to be conveyed during the scan. That is, it replaces the cumbersome concept of one-to-one correspondence of memory space to display space with a concept of time correspondence.

In accordance with the above, the invention broadly includes the method of composing each frame of the display substantially simultaneously with the scan which produces the same. The apparatus includes a memory which stores information sets, e.g. in the form of digital data, which define a plurality of spatial display segments for the display surface area which individually contain information at least partially defining an object image it may be desired to be displayed during a scan, and means providing information defining a background for object images to be displayed during a specified frame display. It further includes means which converts the display segment information and the background information to corresponding control signals for the scanning system. It also includes means which delivers the background defining information and the sets of spatial display segment information to the converting means at times during a scan of a specified frame display correlated with the desired spatial positioning during such scan of background and selected object images.

From the above it will be seen that each of the individual objects which may be displayed during the frame is stored and then addressed for delivery to the scanning system only as required to produce an image of the object in a desired spatial positioning. This is in contrast to prior arrangements which develop and store a map of an entire frame display. When display segments are not being delivered to the scanning system, it is directed to produce a background desired for the display.

The aforesaid means which delivers information to the converter includes means which discharges information defining object images at a rate correlated with the rate at which the scanning system scans the display surface area. Preferably such means includes a first in-first out (FIFO) buffer which will discharge information at such a regular rate irrespective of variations in the regularity with which it receives such information.

The invention includes other features and advantages which will be described or will become apparent from the following detailed description of a preferred embodiment.

BRIEF DESCRIPTION OF THE DRAWING

With reference to the accompanying two sheets of drawing.

DETAILED DESCRIPTION OF THE PREFERRED EMBODIMENT

As mentioned previously, the invention replaces the cumbersome concept of one-to-one correspondence of memory to display space with a concept of time correspondence. That is, each of the frame displays is composed at the very time the frame display is being produced on the display surface area by the scanning system. In furtherance of this, each of the images of objects it may be desired to be displayed are provided in segments of display area, which segments are stored at predetermined locations within a memory. The scan producing a frame is then tracked, and on the scanning system approaching a desired location for a spatial segment having a desired object image, control signals conforming to the stored information defining the segment are delivered to the scanning system.

Figure 1:
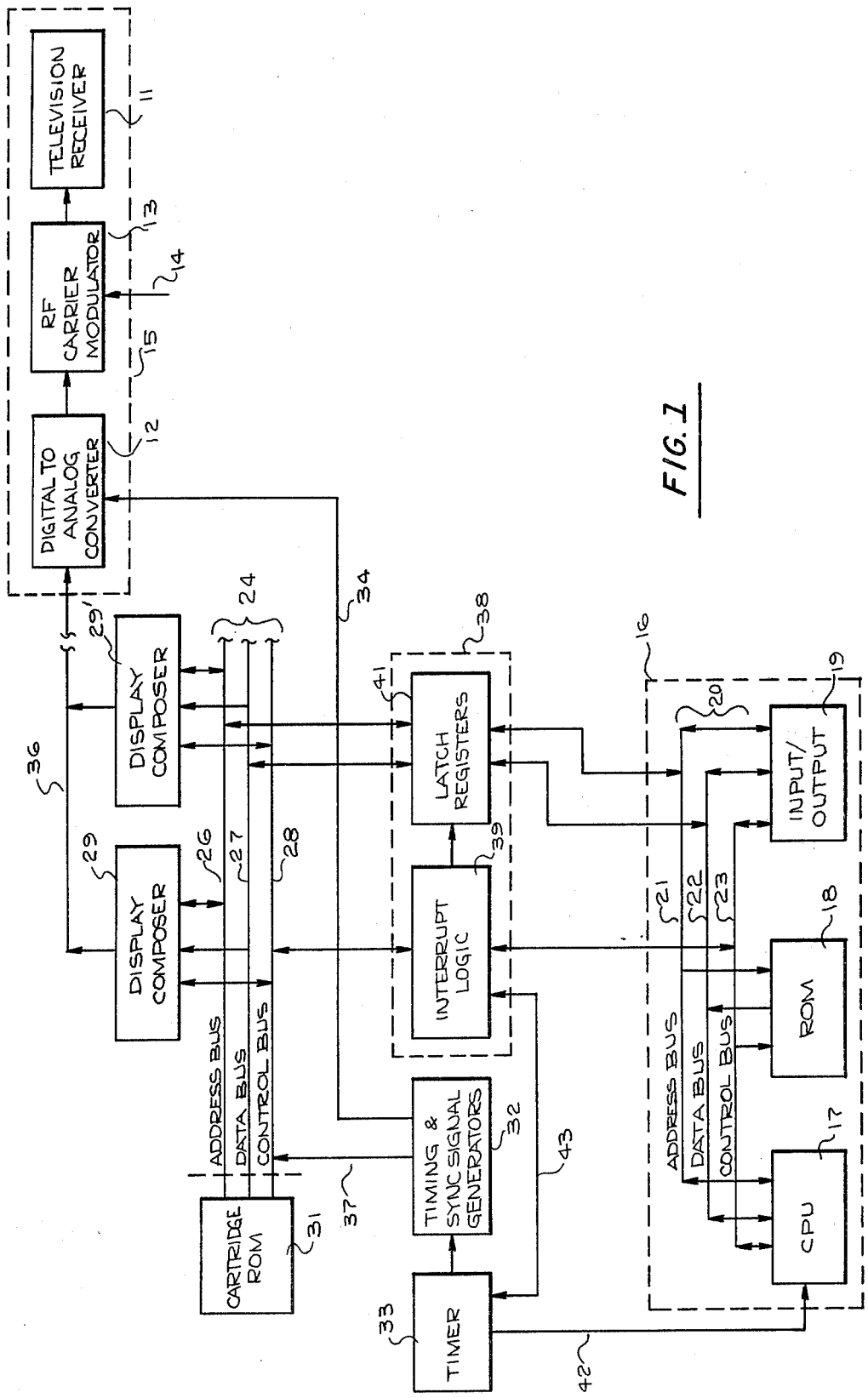
FIG. 1 is an overall functional block diagram of a preferred embodiment of the apparatus of the invention illustrating the same connected between a television receiver and a processor.

FIG. 1 illustrates a major block diagram of a preferred embodiment of the invention and the manner in which it is connected between a scanning display and a processing device. In this preferred arrangement, the scanning display is represented by a standard TV receiver 11; a digital to analog converter 12 which converts the digital scanning information delivered to it by the coupler of the invention to a composite video signal; and an RF carrier modulator 13 which superimposes a radio frequency carrier signal on the composite video signal to condition the same for direct application to the RF input (antenna input) of the TV receiver. The frequency of the carrier can be changed to correspond to the bandwidth of an available channel in accordance with conventional practice. An input line 14 is included to represent such selection capability. The total scanning system is differentiated from the remainder of the system depicted in FIG. 1 by the dotted line enclosure 15.

The processing device in this preferred embodiment is a microprocessor having desired input and output active elements connected thereto. Such microprocessor is represented in FIG. 1 by the dotted line enclosure 16 and includes a central processing unit (CPU) 17 containing the arithmetic and control registers of the microprocessor and its logic, and a read-only memory (ROM) 18 for containing the operations program and subroutines for the CPU 17. The microprocessor could also include additional memory in, for example, the form of a RAM (a read and write memory) if desired for additional storage or manipulative flexibility. Although the invention can couple various general purpose microprocessors to a scanning system, a suitable one which is available and inexpensive is the one designated "F-8" produced both by Mostek Corporation, Carrollton, Texas, and the Fairchild Semiconductor Components Group of Fairchild Camera and Instrument Corporation, Mountain View, California.

The input/output instrumentalities of the processing unit are represented in FIG. 1 by block 19 and their nature will depend on the particular use to which the system is placed. For example, in game applications the input will include manipulative controls such as "joy sticks" and/or alpha-numeric keyboards enabling one or more players to direct movement of display objects on the TV receiver in accordance with playing of a game. The input will also include initiating mechanism, such as a manually operable or coin-actuated OFF-ON switch. The output represented by block 19 includes all desired output from the system except for that to be displayed on the TV receiver 11. For example, during game play this output may include flashing lights, sounds, etc., to indicate reaching of a goal.

The CPU, ROM, and input/output blocks of the processing unit are connected together by a bus system 20 made up of an address bus 21, a data bus 22, and a control bus 23. This bus system will be referred to hereinafter as the microprocessor bus. The utilization of a bus concept makes it possible to add other microprocessor components as desired to increase the capability of the apparatus.

As one feature of the coupler of the invention, it appears to the CPU 17 as merely addressable memory, whereas when it is combined with digital to analog converter 12 and modulator 13 it appears to the TV receiver merely as an incoming video composite signal on an RF carrier. In this connection, the coupler is connected to microprocessor 16 basically only through the bus system 20 and it includes a display composer bus system 24. Bus system 24 is similar to system 20 in that it includes an address bus 26, a data bus 27 and a control bus 28. One or more display composers 29 which will be described in more detail hereinafter connect the bus system 24 to the scanning system 15. The display composers generate and provide to the scanning system 15 digital signals defining desired display picture information. Memory in the form of a ROM 31 also communicates with the bus system 24. Such memory provides sets of information in the form of digital data respectively defining a plurality of spatial display segments, each of which contains information defining object images it is expected to be desired to be displayed on the receiver 11. It further contains the programming necessary to define the specific game or other operations to be performed in connection with such display segments. For example, if the unit is to be used to play a modified sport game, such as a game of football or hockey, each of the players will be provided in the ROM 31 as one or more object images in spatial display segments. The programming provided by such ROM will include microprocessor instructions for playing the game.

From the hardware standpoint, the ROM 31 can be provided as a cartridge which plugs into the remainder of the system. Different spatial display segments defining differing object images and specific operating instructions tailored therefor can be provided. That is, merely by replacing one ROM with another, the particular game or other function for which the microprocessor is coupled to the TV receiver can be changed.

The coupler of the invention includes a timing and sync signal generator 32 which develops and delivers to the digital to analog converter 12 the timing and synchronization signals required to produce a composite video signal for TV receiver 11. Such signals include all composite sync information, i.e., the directions required by the converter 12 to generate the synchronization and equalizing pulses required in a composite video signal, as well as color burst and color burst window information. The rate at which the generator 32 operates is controlled by the primary clock or timer of the coupler represented in FIG. 1 by block 33. The signals developed by generator 32 are delivered to digital-to-analog converter 12, as represented by flow line 34, to be added to the picture information also delivered to such converter by one or more of the display composers 29 as indicated by its input line 36.

Generator 32 also controls timing of the composition of displayed pictures by the display composers 29. In this connection, it delivers to such display composers the horizontal and vertical blanking signals which it also delivers to the converter 12. It also provides a bit rate clock for the output of the display composers. This flow of information to the display composers is represented in the flow diagram by the line 37 extending from the generator 32 to the control bus 28 of bus system 24.

Communication between the microprocessor bus system 20 and the display composer bus system 24 is controlled by a system controller enclosed within the dotted line block 38. Such system controller is basically comprised of two major components, interrupt logic represented at 39 and address and data latching registers represented by the block 41. The interrupt logic represented by block 39 provides control of communication between the bus systems 20 and 24, as well as intercommunication between components on the display composer bus system. The timing of the logic is correlated with the CPU timing. More specifically, timer 33 provides the CPU clock as represented by the flow line 42 extending between such timer and CPU 17. The logic timing is also controlled by the timer 34 as represented by flow line 43. As will be discussed hereinafter, line 43 also represents clock control by the interrupt logic.

Basically, only the microprocessor 16 (particularly the CPU 17 thereof) and each of the display composers 29 requests use of the address and data buses of either of the bus systems 20 and 24. In this connection, the CPU initiates communication not only with each of the other components of the microprocessor, but also with the display composers 29 and ROM 31 connected to the bus system 24. The display composers, on the other hand, initiate communication only with the ROM 31. In general, use of the address or data buses of either of the bus systems is given to the first requestor. If there is a conflict between a request made by the CPU and one of the display composers, the CPU has priority. Any conflicting requests made by different display composers is resolved by alternating cycles of use between the conflicting requestors.

The interrupt logic is designed to satisfy the following algorithm:

BUS CONTROL ALGORITHM

CPU Requests for Bus Use

The CPU can communicate through the bus system 20 with the microprocessor components connected thereto in a conventional manner. That is, it is only when the CPU wants to communicate with any of the components connected to the composer bus 24 that the system controller 38 is activated. As will become apparent hereinafter, at all times controller 38 is so activated its first instruction is to the timer 33 to stop delivering clocking pulses on line 42 to the CPU during the transfer of information between the bus systems. This will prevent the CPU from reacting to address or data information in the process of being changed.

When interrupt logic 39 receives a request from CPU 17 for data contained in the cartridge ROM 31, such interrupt logic 39 will first instruct the timer 33 to discontinue sending clocking pulses to the CPU as discussed above. This has the effect of suspending operation of the microprocessor. When both the microprocessor bus system 26 and the composer bus system 24 are free (the immediately preceding grant cycle is finished), the interrupt logic 39 will gate the cartridge ROM address provided by the CPU on line 21 to address bus 26 of the composer bus system. Once such address is on bus 26, the logic will initiate a ROM reading cycle so that the data at such address will be fed by the ROM onto the data bus 27. At the end of a predetermined time interval selected to assure complete readout of data at any address of the ROM, the content of the data bus is gated into data latches in block 41 for subsequent delivery to the data bus 22 of the microprocessor bus system. The address and data buses of the bus system 24 are thereby freed for subsequent use. Simultaneously therewith, the interrupt logic directs the timer 33 to again deliver clock pulses to the CPU 17 to continue its sequence of operation.

As will become clearer from the later detailed description of one of the display composers, the CPU 17 transfers information into and out of such composers through memory registers and other memory locations. Each of the display composers has a distinctive selection address. When the CPU 17 initiates a request to read a memory location in a display composer so addressed, the request is made to the interrupt logic 39 through control bus 23 of bus system 20. The interrupt logic reacts to such a request by directing timer 33 to discontinue sending clocking pulses to the CPU, with the result that further execution of instructions by the CPU will be suspended. At the earliest time the address and data buses of the composer bus system 24 is free, the interrupt logic will gate the composer address desired from the address bus 21 through an address latch of registers 41 to the address bus 26 of the composer bus system 24.

When CPU 17 initiates a request to enter information into a memory location of one of the display composers 29, its request is applied to the control bus 23 and is received by the interrupt logic 39. The interrupt logic again initially reacts to a request from the CPU for use of the bus system 24 by directing timer 33 to discontinue sending clocking pulses to such CPU in order to suspend its operation. At the earliest time the bus system 24 is free, the interrupt logic will direct gating to address bus 26 through an address latch of registers 41 of the address present on bus 21 it is desired information be entered. Such logic will also indicate which display composer is being addressed. The selected composer will react to the address by entering into the addressed memory location the information then on data bus 27. At the end of a preselected write time cycle, the composer will pulse the interrupt logic to indicate that it has received the address data. The interrupt logic will react thereto by directing timer 33 to again deliver clocking pulses to the CPU so that its operation is restarted.

Frame Composer Requests for Bus Use

As mentioned previously, initiation of reading of information from the ROM 31 by any one of the display composers 29 is also controlled by the interrupt logic 39. When one of such display composers desires data from the ROM, the interrupt logic 39 reacts to a request for such data on the control bus 28 by permitting the particular display composer to read out the desired ROM address onto the address bus 26. The interrupt logic further initiates a read-out cycle from the ROM and directs the display composer to gate in such data. At the end of the preselected period, the interrupt logic is strobed to indicate that the bus system 24 is free for other use.

FRAME COMPOSERS

The frame or display composers 29 are a major component of the present invention. They compose the control signals for each frame to be displayed substantially simultaneously with the display of such frame. The composers accomplish this function by listing where on the receiver display area each spatial segment containing a desired object image is to be shown during a frame; reading from ROM and delivering to the scanning system 15 information defining each spatial segment as it is required during a scan; and producing and delivering to the scanning system background control signals at all other times during a frame scan. In this connection, it should be noted that an object image contained in a spatial segment stored in the ROM 31 is not necessarily an image of a full object when it is displayed on the screen of receiver 11. For example, the object image in a selected spatial segment could be an image of a leg of a football player at a particular orientation, e.g., kicking a football, which will be displayed with another spatial segment from the ROM providing the body of the player. A ROM spatial segment can also include two or more separately identifiable images, such as that of a projectile hitting a tank. The ROM spatial segment can also be one which requires another spatial segment to be superimposed thereon before an identifiable object image is provided, e.g., one spatial segment could define green pants and helmet for a football player while another could define a red jersey for such player. Thus when it is stated a spatial display segment having an object image is stored in the ROM 31, it is meant that information is stored in such ROM which can be manipulated by a frame composer to produce the control signals for the scanning system necessary to compose a preselected spatial display on the TV receiver 11 having dimensions significantly less than those of the full display area of the receiver. Each of such display segments typically includes information at least partially defining an object image. In the particular implementation of the concept of the invention provided by the preferred embodiment being described, each of such spatial display segments is rectangular and often includes information defining background surrounding the object image.

It should be noted in connection with the following that each television raster scan or, in other words, frame is made up of two interlaced fields, an odd and an even field. Thus, whereever hereinafter reference is made to a "field display", one of the fields of a television frame display is being discussed.

Each of the frame composers 29 is capable in this preferred embodiment of directing the display of 16 different spatial segments during each television frame display. Thus when it is expected that more than 16 segments may be displayed during one frame, such as during a modified football game between two eleven-man teams (one man per segment), a sufficient number of frame composers can be applied to the composer bus 24 to accommodate all of such segments. Moreover, separate frame composers are used in this preferred embodiment to superimpose one segment on another during a raster scan. It will be recognized that the number of frame composers which can be included in an embodiment of the invention is not limited except by the processing and communication capability of the particular embodiment.

Figure 2:
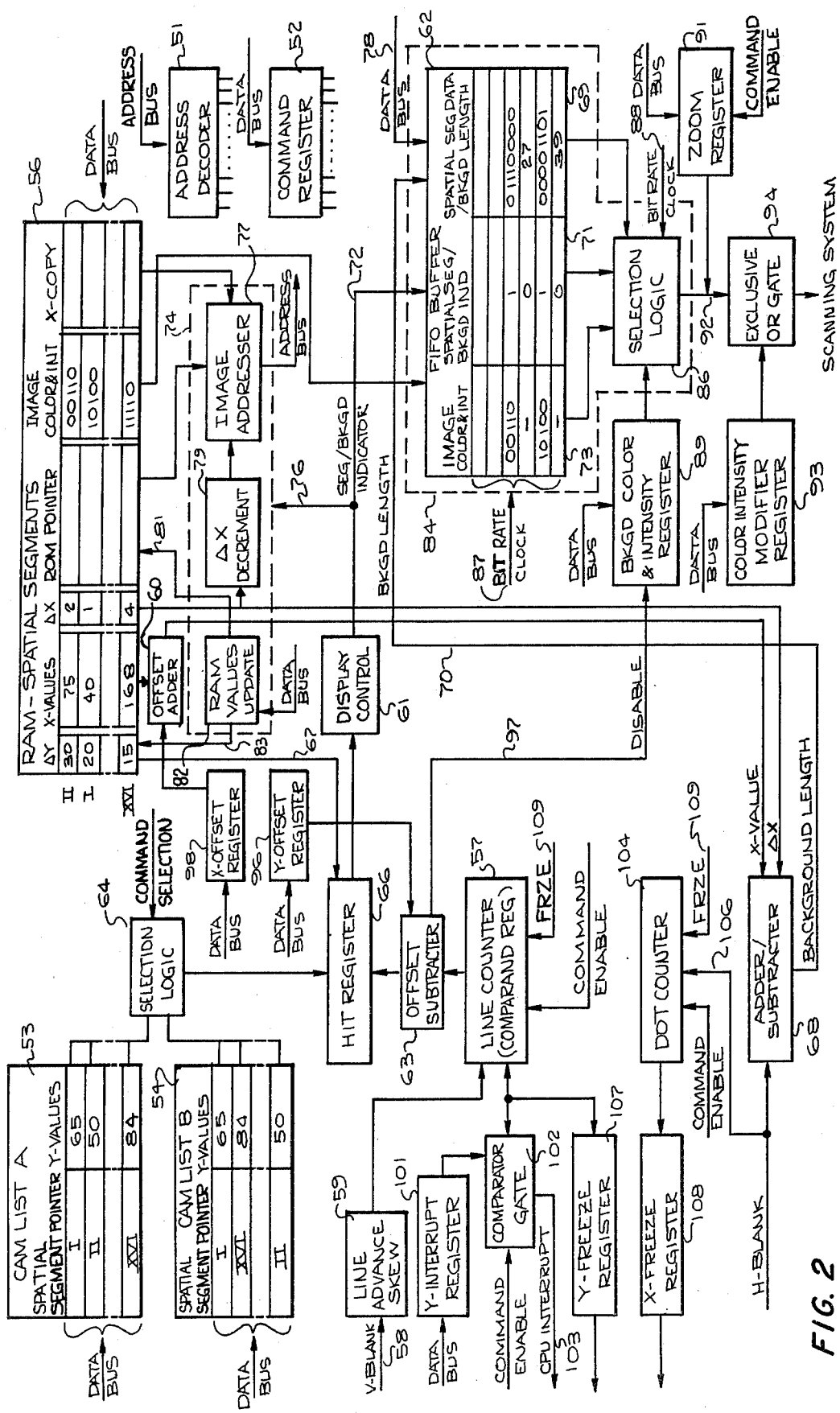
FIG. 2 is a detailed functional block diagram of a display composer of the preferred embodiment of the invention depicted in FIG. 1.

FIG. 2 is a functional block diagram of a preferred frame composer for the invention. The spatial position nomenclature used therein is based on Cartesian coordinates with "X" representing the direction of each scan line and "Y" the direction orthogonal to the scan lines. Each dot on a scan line represents a count of one in the X direction, and each scan line represents a count of one in the Y direction.

Each frame composer includes an address decoder 51 which intercepts all requests to address any of the registers or memory locations to be described. In this connection, the address decoder input is connected to the address bus 26 of the bus system 24, and the decoder is provided with a multiplicity of ENABLE outputs which are individually connected (not shown) to the various registers and memory locations of the frame composer. Each frame composer further includes a command register 52 which not only enables or disables the entire frame composer as an entity, it also enables or selects various function within the frame composer as will be described. It is loaded from the data bus 27 of bus system 24 under the control of the CPU 17.

Each composer of the invention includes means for delivering background defining information and sets of information defining the spatial display segments to the scanning system. Such means includes an associative memory arrangement for listing the spatial display segments to be shown during any specified frame display and the spatial location desired for each in such display. It should be noted that a determination of a desired spatial location for a segment is also a determination of when the segment is to be displayed during the scanning operation for the frame. Information defining a location desired for a segment on the display surface area thus can be referred to as "time-distance" information. The associative memory arrangement also lists the attributes, such as color and intensity, the object images are to have in the specified frame display.

The associative memory includes a pair of CAMs (content addressable memories) 53 and 54, as well as a RAM memory 56 which is operatively associated with such CAMs. The CAMs list the spatial segments in accordance with their order of appearance in the X direction, i.e., the order of their X values. That is, during any specified frame, one of the CAMs lists all of the spatial segments to be displayed in the order in which such segments will be required by the scanning system during the frame scan, irrespective of the location of such segments in the Y direction. While the segments are listed in the order of their appearance in the X direction, it is the line on which each of the segments first appears during a scan or, in other words, its "Y value" which is actually contained in the CAM. As an example, with reference to CAM 53 (list A) it will be seen that the X order of the spatial segments to appear in the frame display represented by CAM 53 have, in order, the Y values of 65, 50 . . . 84. While each of the CAMs has a memory size enabling the listing of 16 different spatial segments, only three, the first two and the last one, are illustrated in FIG. 2. As will be described more fully below, each of the CAMs 53 and 54 is to be used alternatively depending on whether or not there is a change in the X order of the segments between discrete frame displays.

RAM 56 also provides a list accommodating 16 different spatial segments. While the segment entries in the RAM list are not in any particular order, each is distinctively associated with its Y value in the CAM being used at the time. The RAM listing for each of the spatial segments includes the number of scanning lines that have information defining the particular spatial segment (delta Y); the location along each of the lines first encountered by the scanning system which includes information on the spatial segment (its X value); the length in bytes of the segment along each of the lines (delta X); the address in the ROM 31 at any given time giving the location of the segment information which will be required next (the ROM pointer); and the attributes, e.g. color and intensity, desired for the object image or images in the segment. The list in the RAM further includes for each of the spatial segments an "X copy" bit which will be explained hereinafter.

Means are included for tracking the scan of the scanning system as it produces each frame display. That is, a line counter 57 is included which keeps track of the position of the scanning system in the line or "Y" direction by counting the lines scanned during each field. Counter 57 is reset by the vertical retrace pulse of the timing signal as indicated by the V-blank input 58 to a line advance skew 59. Skew 59 is included to advance by one the count being registered by counter 57. It has been found that such a one-line advance provides the composer with the lead time it requires to assure that information required for scanning is at its output when needed by the scanning system. In this connection, in one actual embodiment each scanning line is scribed in about 64 microseconds. Thus, the line advance provides a 64 microsecond advance to the operation of the composer.

Line counter 57 acts as a comparand register for whichever of the CAMs 53 and 54 is in operation during scanning for a particular frame. Its value is incremented by one, at the end of each scanning line during the horizontal retrace for the next line to be scanned. Such counter cooperates with a display control 61 to direct delivery to a first in-first out (FIFO) buffer 62, digital information defining the upcoming line to be scanned. That is, assuming subtracter 63 (the purpose of which will be discussed hereinafter) is not actuated at the time, the value registered by line counter 57 will be simultaneously compared at the beginning of each horizontal retrace with all of the Y values listed in the particular CAM which is to be compared therewith during a specified frame as determined by selection logic 64. As an example, if line counter 57 is registering the count "65" and it is compared with the list in CAM 53, a favorable comparison will be registered for the spatial segment denoted "I". This will result in the hit register 66 issuing a "hit" signal to the display control 61. Hit register 66 has additional activating input from the RAM 56. That is, it continues to issue hit signals to the display control 61 for any of the spacial segments which were first displayed on earlier scan lines during the frame but have a length in the Y direction which requires information defining the same to also be displayed on the particular scan line being loaded into the buffer 62. This is represented by the flow line 67 extending to such register from the delta Y portion of RAM 56. In the particular example being used, the RAM 56 will indicate to the hit register 66 that segment II is also to be displayed on scan line 65. That is, such segment first appeared on line 50 as is evidenced by the Y value for the same located in CAM 53. Its length in the Y direction, however, is twenty lines, as indicated in the delta Y portion of the RAM, with the result that information defining the segment also appears on scan line 65. It should be noted that the delta Y of each segment which has appeared on a line is decremented before the start of the next line so that the delta Y for such segments will become exhausted and not provide input to hit register 66 when information defining the segment is no longer to be part of a scan line.

Upon receiving a hit signal from register 66, display control 61 will respond thereto by initiating several operations. It will first direct RAM 56 to deliver through an offset adder 60 (the purpose of which will be brought out later) to an adder/subtracter 68 the X value of the first spatial segment to be displayed on the line in question. The adder/subtracter will utilize such information along with the horizontal retrace pulse to calculate the length of background at the beginning of the line prior to the first spatial segment to be displayed on the line. This background length or, in other words, time-distance information will be delivered to an information section 69 of the FIFO buffer in numeric form as represented by flow line 70. In the example being used, the adder/subtracter 68 will deliver the number "39" in binary form to the section 69 since there are 39 dots of background which are to be produced in the specified frame prior to the appearance of the first spatial segment, segment I. The display control 61 will also deliver to an indication section 71 of the FIFO buffer a symbolic bit (in the example, an "0") which indicates that the information delivered to section 69 by the adder/subtracter is background information. This is represented by the flow line 72 extending from the display to such buffer section.

Once the information defining the initial background, if any, is delivered to FIFO buffer 62, the information required by such buffer to display the first spatial segment appearing on the line is then loaded. More particularly, display control 61 directs RAM 56 to deliver to the attribute section 73 of the buffer 62 the digital information in such RAM defining the color and color intensity the object image or images within the first segment are to have during the frame display. RAM 56 also delivers a segment indicator (a "1" in the case of the example) to FIFO buffer section 71.

The segment indicator is also sensed by direct memory access (DMA) logic set apart by dotted line outline 74. Such sensing is represented by information flow line 76. DMA logic 74 acts, in effect, as means responsive to the scan tracking indicating that the scanning system is approaching a desired spatial position for a selected spatial segment by directing the ROM to deliver information required to produce such segment to the information discharging portion of the composer. Logic 74 also acts to update those variables in RAM 56 which are decremented or incremented for a display.

DMA logic 74 includes an image addresser 77 which takes from the ROM pointer section of the RAM 56, the ROM address for the first information defining that portion of the segment which is to appear on the line being scanned and delivers it via the address bus to the cartridge ROM 31. The cartridge ROM reacts thereto by delivering the information at such address for the line being scanned to the information section 69 of the buffer 62 as is represented by flow line 78. In this connection, the information defining a segment is stored in the ROM as symbolic digital data in one byte sections, one at each address. The DMA logic therefore includes a delta X decrement 79 which reacts to the number of bytes defining the segment in the X direction by advancing the image addresser from one address to another until such time as the number of bytes of information required to define the spatial segment on the line is delivered to the buffer 62. Once the information is so delivered, the address specified for the segment in the RAM 56 is updated to the address which provides the first information required for the next line of the segment to be produced. This is represented by flow line 81 extending to the ROM pointer portion of the RAM 56 from a RAM values update block 82 within the DMA logic 74. The delta Y for the segment is also decremented by the DMA logic at this time for the purpose discussed earlier. Such decrementation is represented by the flow line 83 extending from the update block 82 to the delta Y portion of the RAM 56.

In the particular example being used in which the spatial display segment labelled "I" follows the first background information, image color and intensity indicia "10100" will have been delivered to attribute section 73 of buffer 62, the binary bit "1" will be delivered to the indicator section, and the binary data "00001101" defining the segment will have been delivered to the information section of such buffer. In this connection, it should be noted that the information set defining the segment includes information defining the background for object images within the segment. In this example, a binary "0" represents a background dot whereas a binary "1" defines an object image.

After the information required to display spatial segment I at the proper location is loaded into buffer 62, information defining the background, if any, between it and the next segment in sequence is loaded into the buffer. To this end, display control 61 directs that the X value of the next segment be delivered to adder/subtracter 68 along with the delta X value from the segment just loaded. Adder/subtracter 68 calculates from such information the time-distance or, in other words, length between the segments which are to be sequentially displayed, and delivers the result of such calculation to the information section 69 of FIFO buffer 62. In the example being used, such length is 27 dots, the difference between the end of spatial segment I and the beginning of spatial segment II. Again, this information is provided to the information section in numeric form, and the display control delivers to the indication section 71 a symbolic bit which indicates that the number represents background information rather than spatial segment data.

Information defining spatial segment II can then be delivered to buffer 62 in accordance with the procedure discussed above in connection with segment I. Additional background and segments to complete the line will sequentially be delivered to the buffer. In this connection, the time-distance or length for the last background in the line is calculated by the adder/subtracter 68 from the delta X of the previous segment and the horizontal retrace pulse at the end of the line.

This sequential operation of delivering to the buffer 62 all of the information needed by it to define a line can be completed in a relatively short time. In this connection, the information required for most scans of a line easily can be completed during the horizontal retrace time. However, depending on the depth of the FIFO buffer, more complicated displays may require the information delivery to be completed after the actual scan of the line has started. The provision of a FIFO buffer 62 as part of the information discharge means prevents such a delay from affecting the operation of the scan system. More particularly, it is only necessary that the information be delivered to the buffer prior to the time it is actually required during the scan since a FIFO buffer will immediately deliver to its output any information which is received by it.

The information discharge means of which the buffer 62 is a part is contained within the dotted line section 84. Such discharge means assures that the information defining a line being scanned will be delivered to the scanning system at a regular rate correlated with the rate at which such scanning system scans the display surface area of the TV receiver to produce a frame display. More particularly, the buffer 62 delivers the background defining information to selection logic 86 whose output is correlated with the bit rate and which delivers the symbolic information defining the individual segments serially at such rate. Control of the rate of the discharge from buffer 62 of the segment information is represented by bit rate clock input 87 to such buffer, and control of the rate at which background information is delivered to the scanning system is represented by a similar input 88 to selection logic 86.

At the beginning of a line scan, the first information discharged from buffer 62 will be the information defining the length of background before spatial segment I is displayed. That is, the selection logic 86 will first decode the background length numeral and cause delivery to the scanning system of background information for the number of dots so designated. The background information for the display surface area is provided by a background color and intensity register 89 which is loaded via the data bus 27 under the control of the CPU. Immediately after such delivery of the first designated background information is finished, the buffer 62 will serially deliver to logic 86 both the data defining the spatial segment I and, when required, the color and intensity information for the object image or images therein. When the spatial segment data indicates background, the selection logic will direct register 89 to deliver information defining the same to the scanning system, whereas when the segment data indicates an object image, the selection logic 86 will direct to the scanning system the color and intensity information for the spatial segment contained in the attribute section 73 of the buffer.

The discharge arrangement will continue to serially direct to the scanning system information defining the line being scanned until such time as the line is finished. The entire process will then be repeated for the next line. In this connection, when a field for a frame display is completed in accordance with the above, the line counter 57 will be reset by the vertical blank pulse and those values relating to spatial segments which have been changed during the field scan will be updated. That is, the delta Y's of the segments which have been displayed will be returned to their full value and the ROM pointer address of each displayed segment will be updated to that address in the ROM which contains the first information which will be required for the segment in question during the new field.

The delta Y and ROM pointer addresses will be similarly updated between frame displays. Moreover, if there is a difference in the X order of the segments to be displayed, command register 52 will issue a selection bit to CAM selection logic 64 to change the CAM list which is compared during the frame scans. In this connection, providing a pair of CAMs enables the X order set forth in one to be updated during a display while the other is being used for comparisons.

The simultaneous composition of a display at basically the same time the display is produced by a scanning system provides significant versatility to the kinds of information which can be displayed. Moreover, it enables manipulations and other functions related to the display to be carried out in relatively straight-forward manners. The preferred embodiment of the invention being described includes arrangements for performing certain functions and manipulations relating to the display which are especially desirable. For example, with the instant invention it is a simple matter to "zoom" or, in other words, enlarge or contract the spatial segments which are displayed. To this end, the apparatus includes memory means in the form of a zoom register 91 which stores information it receives from the data bus 27 defining a size multiplication desired for a spatial display segment. As illustrated, the zoom register 91 communicates with the output of the selection logic 86 represented by flow line 92. Upon receiving an enabling command from command register 52, the zoom register 91 will deliver the multiplication information to logic (not shown) at the output which will multiply the spatial segment data accordingly to enlarge the segment as displayed.

The apparatus of the invention also includes an arrangement for modifying the color and/or intensity information emanating from the selection logic 86. More particularly, a color and intensity modifier register 93 is provided to store color and intensity information which is exclusively OR'ED, as represented by gate 94, with the display color and intensity information prior to its delivery to the scanning system. Thus, the color or intensity of either the object images or the background can be changed as desired. In this connection, it may be desired to change the same between sequential frame displays or sets of frame displays in order to present to the viewer a flashing color display.

The composer also includes means which will cause a display segment to be repeatedly displayed. More particularly, the "X copy" of RAM 56 is for the purpose of containing a symbolic bit of information associated with each of the segments indicating whether such segment is to be repeated when it is addressed. If it is to be so repeated, the bit of information is conveyed to the image addresser 77 of the DMA logic to direct the same to not be decremented during a line scan but rather to repeat the address contained within the ROM pointer section of such RAM until such time as the delta X for the segment is exhausted. The RAM value update 82 will then update the ROM pointer to the address for information appearing on the next scan line, which address will again be repeated during the succeeding line scan for the number of times indicated by the delta X decrement. Thus the information delivered from the cartridge ROM 31 to the spatial segment data section 69 of the buffer 62 during each line scan will be repeated so the scanning system will produce the selected segment a plurality of times adjacent one another on the display surface area. This function of the apparatus is particularly useful in producing a repetitive background on the display area, such as a checkerboard background.

The coupler of the invention also includes means enabling the display provided by the composer to be limited to a specified portion of the full display surface area rather than fill the same. This aspect of the invention is useful, for example, in a game in which it is desired to simultaneously present two different displays on a single TV receiver, each of such displays filling a separate half of the receiver. The different displays would then be composed of separate composers, each one of which would limit its display to the half of the display surface area assigned to it. Offset arrangements for both the X and Y display directions provide this display limiting function. Insofar as the Y direction is concerned, the offset arrangement includes a Y offset register 96 for storing information indicative of the location in the Y direction on the display surface area that the first line to be scanned is to be positioned. Offset subtracter 63 responds to the offset register 96 containing information indicative of a starting location for the first line different than the normal starting line, i.e., a line count different than zero, by delaying the start of the comparisons by the hit register 66 until such time as the line counter 57 reaches the count indicated by register 96. The subtracter further disables the output of the background register 89 until the offset count is reached, as indicated by disable flow line 97. The display in the Y direction will therefore not start until such time as the Y offset register count is reached. This will prevent the picture information from the composer from being displayed in that portion of the display area above the Y offset register count. It will be recognized that if it is desired to prevent a display below a particular location, the display can be so limited by disabling the background register when a count set forth in the Y offset register is reached.

An X offset register 98 is provided as an input to the offset adder 60 to enable the display to be limited in the X direction. Whatever count is contained in the register 98 will be added by adder 60 to the X value delivered from RAM 56 to the adder/subtracter 68. This will offset the scan in the X direction by the number of dot counts indicated in the X offset register and, hence, limit the display to the righthand portion of the display area. If it is desired to limit the display to the lefthand portion of the display area, the count in X offset register 98 can be used to inhibit the output of the discharge means 84 on each line after the count is reached.

The apparatus enables an interrupt signal to be generated for application to the CPU interrupt pin at any designated scan line. To this end, it includes a Y interrupt register 101 which receives from the data bus 27 under control of the CPU 17 information designating a line at which the interrupt signal is desired to be issued during a given frame display. Upon receiving an enabling command from command register 52, a comparator gate 102 compares the value in Y-interrupt register 101 with the count of counter 57. Upon comparison of equality, gate 102 will issue an interrupt signal for application to the CPU interrupt pin as represented by flow line 103. The CPU can react thereto in any desired way determined by the programming, such as by shifting from one set of instructions to another.

In some games and other potential applications of the apparatus of the invention, it is desirable to be able to store a location on the display area being scanned at a particular time when an external command signal is received. For example, in a war game it may be desirable to be able to point or "shoot at" a location on the display surface with a light pen or the like to indicate a "hit" at such location. A simple means for storing or, in other words, freezing such a location is also included in the preferred embodiment. To this end, the composer includes a dot counter 104 in addition to the line counter 57. Whereas line counter 57 keeps track of the line being scanned at any given time dot counter 104 keeps track of the dot or location in the X direction along each line as it is being scanned. In this connection, dot counter 104 receives reset input as represented by flow line 106 from the horizontal retrace signal.

After receiving a freeze ENABLE signal from command register 52, both line counter 57 and dot counter 104 will dump respectively into Y freeze and X freeze registers 107 and 108 their values on receiving external stimuli as represented by the "freeze" flow lines 109. The content of the freeze registers 107 and 108 can be interrogated by the CPU to initiate an action based on the values therein. For example, if the external stimuli is provided by a light pen acting as a gun in the manner set forth earlier, the action initiated by the CPU may be the presentation of a spatial display segment in the next frame showing as an object image an explosion at the frozen location.

SYSTEM PROGRAMMING

As mentioned previously, all of the registers and other memory locations within each of the composers 29 is accessed by the CPU through the address decoder of the particular composer in question. Addressing of the delta Y, ROM pointer and image color and intensity sections of the RAM should be avoided during the time such values are being updated between fields or frames. Also spatial segments should be written into the CAM and RAM only during the vertical blank between even and odd fields. Otherwise, the composers are freely addressable subject to the availability of bus system 24.

As discussed earlier, for each composer there are 16 potential objects that can be displayed, and hence the RAM 56 and each CAM 53 and 54 are 16 entries long. Any entry in a CAM list that is within the range of actual Y (line) values visible on the screen will be interpreted as a segment to be displayed on the screen. For NTSC systems this range is 0–263 lines. Thus, if fewer than 16 objects are being displayed at a given time, some of the CAM entries contain values outside of the appropriate range; this in effect disables that entry.

In one specific implementation of the invention, the registers in each display composer are classified into three categories; WRITE ONLY, READ ONLY and READ/WRITE. The WRITE ONLY and READ ONLY registers perform mainly control and status functions. The READ/WRITE registers are used to describe the segments being displayed. All of these registers are accessed by the CPU 17 through its memory address space. When accessing composer registers in such implementation, the following rules should be observed:

(1) Avoid accessing composer registers during the direct memory access logic window which occurs during the first two H-blank pulses (lines 0 and 1) following the leading edge of V-blank.

(2) Adding a new segment of the screen (or at least placing it on the active CAM and RAM list) should only be done during the V-blank between even-to-odd field transition (excluding DMA window time). This also applies to control bits of the command register.

(3) The optimal time to move a segment on the display area by switching from one CAM list to the other and changing the X value of the segment if necessary is during lines 3 to 21 of either field.

| Display Computer Address Assignments - Specific Implementation | | | | | | | | |
|---|---|---|---|---|---|---|---|---|
| Write Only Registers: | ADDRESS | | | | | | | |
| Command Register | 1 | 1 | 1 | 1 | 0 | 1 | 1 | 1 |
| Zoom Register | 1 | 1 | 1 | 1 | 0 | 1 | 1 | 0 |
| Background Register | 1 | 1 | 1 | 1 | 0 | 1 | 0 | 1 |
| Y-Offset Register | 1 | 1 | 1 | 1 | 0 | 1 | 0 | 0 |
| X-Offset Register | 1 | 1 | 1 | 1 | 0 | 0 | 1 | 1 |
| Final Modifier Register | 1 | 1 | 1 | 1 | 0 | 0 | 1 | 0 |
| Y-Interrupt Register | 1 | 1 | 1 | 1 | 0 | 0 | 0 | 0 |
| Read Only Registers: | | | | | | | | |
| X-Freeze Register | 1 | 1 | 1 | 1 | 1 | 0 | 0 | 0 |
| Y-Freeze Low Order Register | 1 | 1 | 1 | 1 | 1 | 0 | 0 | 1 |
| Y-Freeze High Order Reg. | 1 | 1 | 1 | 1 | 1 | 0 | 1 | 0 |
| Current Y Low Order Reg. | 1 | 1 | 1 | 1 | 1 | 0 | 1 | 1 |
| Read/Write Registers Associative Memory: | | | | | | | | |
| ROM Pointer Low Order | 0 | 0 | 0 | 0 | X | X | X | X |
| ROM Pointer High Order and Color | 0 | 0 | 0 | 1 | X | X | X | X |
| ΔX, Intensity & X-Copy | 0 | 0 | 1 | 0 | X | X | X | X |
| ΔY Register | 0 | 0 | 1 | 1 | X | X | X | X |
| X Value Register | 0 | 1 | 0 | 0 | X | X | X | X |
| Y Value Low Order List A | 0 | 1 | 0 | 1 | X | X | X | X |
| Y Value Low Order List B | 0 | 1 | 1 | 0 | X | X | X | X |
| Y Value High Order and X Order List A | 0 | 1 | 1 | 1 | X | X | X | X |
| Y Value High Order and X Order List B | 1 | 0 | 0 | 0 | X | X | X | X |
| Write Only Registers: | | | | | | | | |
| Command Register - Address = F7 | | | | | | | | |

| BIT | 7 | 6 | 5 | 4 | 3 | 2 | 1 | 0 |
|---|---|---|---|---|---|---|---|---|
| | YINT N.O. | A/B̄ | Y-ZM | INT. SEL. | INT. | ENB | FRZ | |

FRZ: Freeze bit defines CPV Interrupt Pin as an input (FRZ=1) such that when it is stimulated externally, the contents of the Dot Counter and Line Counter are instantaneously copied into the freeze registers which can be interrogated by the CPU.

ENB: Enable bit, 0=all DMA, Video and X logic activities of composer are disabled. 1=composer is enabled.

INT: Interrupt bit, this bit only has affect when the FRZ bit equals 0. In this case, the Interrupt pin is defined as an output.
INT=0=interrupt disabled
INT=1=interrupt enabled, and interrupt source is defined by INT. SEL. bit.

INT. SEL.: When FRZ=0 and INT=1, this bit selects the interrupt source

INT SEL=0= ↑ of V-blank is interrupt source
INT SEL=1=Y counter compare with Y interrupt register is the interrupt source.

Y-ZM: Y-Zoom bit
Y-ZM=0=no room in Y direction
Y-ZM=1=zoom in Y direction as indicated by Y-multiplier.

X-ZM is arranged to be on at all times.

A/B̄: Specifies which list, A or B is to be used by X and CAM logic.
A/B̄=0=B list active
A/B̄=1=A list active YINT H.O.: This is the high order bit of the Y-Interrupt Register.

Zoom Register - Address = F6

| BIT | 7 | 6 | 5 | 4 | 3 | 2 | 1 | 0 |
|---|---|---|---|---|---|---|---|---|
| | X3 | X2 | X1 | Y10 | Y3 | Y2 | Y1 | Y0 |
| | X-MULTIPLIER | | | | Y-MULTIPLIER | | | |

Y-MULTIPLIER:
0 0 0 0 = No multiplication (x1)
0 0 0 1 = x 2
0 0 1 0 = x 4
0 1 0 0 = x 8
1 0 0 0 = x 16

X-MULTIPLIER:
0 0 0 0 = No mult. (x 1)
0 0 0 1 = x 2
0 0 1 0 = x 4
0 1 0 0 = x 8
1 0 0 0 = x 16

Background Register - Address = F5

| BIT | 7 | 6 | 5 | 4 | 3 | 2 | 1 | 0 |
|---|---|---|---|---|---|---|---|---|
| | X | X | X | INT 1 | INT 0 | BLU | GRN | RED |

This register specifies the color and intensity of the screen background. INT 1 and INT 0 are the intensity bits to be interpreted as follows:

| INT 1 | INT 0 | |
|---|---|---|
| 0 | 0 | Lowest Intensity |
| 0 | 1 | → |
| 1 | 0 | → |
| 1 | 1 | Highest Intensity |

RED, BLUE and GREEN are the color bits, presenting eight possible colors:

| RED | GREEN | BLUE | |
|---|---|---|---|
| 0 | 0 | 0 | Black |
| 0 | 0 | 1 | Blue |
| 0 | 1 | 0 | Green |
| 0 | 1 | 1 | Green-Blue |
| 1 | 0 | 0 | Red |
| 1 | 0 | 1 | Red-Blue |
| 1 | 1 | 0 | Red-Green |
| 1 | 1 | 1 | White |

Y-Offset Register - Address = F4

| BIT | 7 | 6 | 5 | 4 | 3 | 2 | 1 | 0 |
|---|---|---|---|---|---|---|---|---|
| | MSB Y7 | Y6 | Y5 | Y4 | Y3 | Y2 | Y1 | LSB Y0 |

MSB=Most significant bit
LSB=Least significant bit
This register specifies a fixed offset for the Y co-ordinates of all segments to be displayed. In affect it defines where line Y=0 is located on the display area. If this register=0 then line 0 is the first line immediately following the rising edge of V-blank.

X-Offset Register - Address = F3

| BIT | 7 | 6 | 5 | 4 | 3 | 2 | 1 | 0 |
|---|---|---|---|---|---|---|---|---|
| | MSB X7 | X6 | X5 | X4 | X3 | X2 | X1 | LSB X0 |

Specifies the amount of offset from the left side of the screen If X-Offset=0 then X bit position occurs at the first bit clock after the trailing edge of H-blank.

Final Modifier Register - Address = F2

| BIT | 7 | 6 | 5 | 4 | 3 | 2 | 1 | 0 |
|---|---|---|---|---|---|---|---|---|
| | X | X | X | INT 1 | INT 0 | BLUE | GRN | RED |

The final video output pins are always exclusive OR'ed with the contents of this register.

Y-Interrupt Register - Address = F0

| BIT | 7 | 6 | 5 | 4 | 3 | 2 | 1 | 0 |
|---|---|---|---|---|---|---|---|---|
| | MSB −1 | | | | | | | LSB |

This registers contents (plus the Y INT H.O. bit in the Command Register) are compared with the current line counter contents and if the INT. bit=1 and INT SEL bit=1 then a true comparison will result in a lower voltage state being placed on the CPU interrupt pin.

Read Only Registers

X-Freeze Register - Address = F8

| BIT | 7 | 6 | 5 | 4 | 3 | 2 | 1 | 0 |
|---|---|---|---|---|---|---|---|---|
| | MSB | | | | | | | LSB |

This register receives a copy of the current dot counter (the current X co-ordinate of the scanning beam) when the FRZ bit=1 and a negative transition is detected on the CPU interrupt pin.

Y-Freeze Low Order Register - Address = F9

| BIT | 7 | 6 | 5 | 4 | 3 | 2 | 1 | 0 |
|---|---|---|---|---|---|---|---|---|
| | MSB −1 | | | | | | | LSB |

Receives a copy of the current Y-counter (current line number) when the FRZ bit=1 and a negative transition is detected on the CPU interrupt pin.

Y-Freeze High Order and Odd/Even Register - Address = FA

| BIT | 7 | 6 | 5 | 4 | 3 | 2 | 1 | 0 |
|---|---|---|---|---|---|---|---|---|
| | O/E | X | X | X | X | X | Y-C8 | Y-F8 |

V-F8: This bit is the Y-Freeze high order (MSB) bit which should be concatenated with the Y-Freeze Low Order Register contents to form the complete 9-bit Y-Freeze address. As with the Y-Freeze Low Order Register, this bit is loaded with the value of the current Y-counter when the FRZ bit=1 and a negative transition is detected on the Interrupt Pin.

Y-C8: This is the MSB of the current Y-counter, i.e., the current line number, and should be concatenated with the current Y-Freeze Low Order Register to determine the line number.

O/E̅: Indicates whether the screen is currently displaying the odd field or even field.
O/E̅=0=Even Field
O/E̅=1=Odd Field Current Y Low Order Register - Address = FB

| BIT | 7 | 6 | 5 | 4 | 3 | 2 | 1 | 0 |
|---|---|---|---|---|---|---|---|---|
| | MSB −1 | | | | | | | LSB |

Low order bits of the current Y (line) counter. This counter is reset on the leading edge of V-blank, and incremented by each succeeding H-blank pulse.

READ/WRITE REGISTERS

Each segment to be displayed on the screen has a set of Registers in the composer which are used to describe the coordinates of that segment on the screen and the attributes of the object image or images in such segment. A total of 16 objects can be displayed using one composer. The set of registers for each segment are as follows (the XXXX is used to designate one of the 16 objects):

ROM Pointer Low Order - Address = 0000 XXXX

| BIT | 7 | 6 | 5 | 4 | 3 | 2 | 1 | 0 |
|---|---|---|---|---|---|---|---|---|
| | RP7 | RP6 | RP5 | RP4 | RP3 | RP2 | RP1 | RP0 |

RP0–RP7—the low-order eight bits of the first ROM Address containing the segment information.

ROM Pointer High Order and Color - Address = 0001 XXXX

| BIT | 7 | 6 | 5 | 4 | 3 | 2 | 1 | 0 |
|---|---|---|---|---|---|---|---|---|
| | RED | GRN | BLU | RP12 | RP11 | RP10 | RP9 | RP8 |

RP8–RP12—the high-order five bits of the first ROM Address containing segment information. These bits are concatenated with the ROM Pointer Low Order bits.
BLU, GRN, RED—bits defining the color of the object image. A "0" means that color is off, a "1" means that color is on.

ΔX, Intensity and X-Copy - 0010 XXXX

| BIT | 7 | 6 | 5 | 4 | 3 | 2 | 1 | 0 |
|---|---|---|---|---|---|---|---|---|
| | X-COPY | INT 1 | INT 0 | ΔX4 | ΔX3 | ΔX2 | ΔX1 | ΔX0 |

ΔX0–ΔX4—These five bits specify how many bytes wide the segment is.
INT 1 and INT 0 —Specify the intensity of the object in the segment. Four levels of intensity, with 00 being the lowest level and 11 being the brightest.
X-COPY—When this bit equals zero, the ROM pointer is incremented after each byte fetch until ΔX is decremented to zero. When this bit equals one, the ROM pointer is not decremented after each byte fetch (only after the last fetch).

ΔY Register - Address = 0011 XXXX

| BIT | 7 | 6 | 5 | 4 | 3 | 2 | 1 | 0 |
|---|---|---|---|---|---|---|---|---|
| | MSB | | | | | | | LSB |

This register indicates the height of the segment or, in other words, how many scan lines include information defining it. For example, if ΔX=5 and ΔY=20 for a particular object, then the object is described by a five byte (40 dot) by 20 line (in each field) array in ROM 31.

X-Value Register - 0100 XXXX

| BIT | 7 | 6 | 5 | 4 | 3 | 2 | 1 | 0 |
|---|---|---|---|---|---|---|---|---|
| | MSB | | | | | | | LSB |

X-ORDA0–X-ORDA3—X-order entry for List A.
Y-VAMSB—The most significant bit of the Y-coordinate of the object for List A.

Y Value High Order and X-Order List B - Address = 1000 XXXX

| BIT | 7 | 6 | 5 | 4 | 3 | 2 | 1 | 0 |
|---|---|---|---|---|---|---|---|---|
| | Y-VB MSB | X | X | X | X ORD B3 | X ORD B2 | X ORD B1 | X ORD B0 |

X-ORDB0 through X-ORDB3—X-order entry for List B.
Y-UBMSB—The most significant bit of the Y-coordinate of the object - List B.

The coupler of the invention has been programmed, utilizing the specific register implementation described above, to display a "pinball" video game which is externally controlled by a user. The following pages is program listing of the assembled language for such game. The microprocessor utilized is the previously mentioned F-8 microprocessor available from Mostek Corporation and the Fairchild Semiconductor Components Group of Fairchild Camera and Instrument Corporation. It was programmed in accordance with the F-8 *User's Guide* and *Guide to Programming available in* 1976 from Fairchild; and the 1975 F-8 *Preliminary Data Book* available from Mostek. The memory allocations (in hexadecimal) for the following are:
ROM "Pinball" Program: F800-FFAF
Display Composer: 0800-0BFF
ROM Segment Information: 1000-17FF
Also, the designation UM1 is used to refer to the display composer; and the designation UM 2 is used to refer collectively to the system controller, the timer and the timing and sync signal generator.

TAPE 134A     15 DECEMBER 1976     0945 HOURS

```
C
0000        ************************************************
0001        *       INITIALIZATION PACKAGE COMMON TO       *
0002        *       ALL PROGRAMS ON THE UM1/UM2            *
0003        *       SYSTEM. PROGRAM PACKAGE REQUIRES       *
0004        *       MEMORY LOCATIONS F800 THROUGH          *
0005        *       F83F--A TOTAL OF 40 BYTES (HEX).       *
0006        ************************************************
0007        *       PROGRAM FUNCTIONS:                     *
0008        *       (1) CLER  LOADS MEMORY LOCATIONS       *
0009        *                 800-83F WITH FF.             *
000A        *       (2) INIT  TRANSFERS XX BYTES OF        *
000B        *                 DATA (XX BEING STORED        *
000C        *                 IN REGISTER 1) STARTING      *
000D        *                 AT LOCATION GIVEN BY         *
000E        *                 REGISTER 0 TO LOCATION       *
000F        *                 GIVEN BY REGISTER H.         *
0010        *       (3) INTS  INITIALIZES ALL UM           *
0011        *                 REGISTERS WITH DATA          *
0012        *                 STARTING IN LOCATION         *
0013        *                 GIVEN BY REGISTER 0          *
0014        *       (4) SYNC  SYNCHRONIZES TO LINE         *
0015        *                 NUMBER HEX D. WILL NOT       *
0016        *                 SYNCHRONIZE TO CORRECT       *
0017        *                 FIELD.                       *
0018        ************************************************
0019        *       PROGRAM ENTRY POINTS:                  *
001A        *           CLER----H'F800'                    *
001B        *           INTS----H'F817'                    *
001C        *           INIT----H'F80D'                    *
001D        *           SYNC----H'F837'                    *
001E        ************************************************
001F                        ORG     H'F800'
0020 F800 2A 08 00  CLER    DCI     H'800'
0021 F803 20 90             LI      H'90'
0022 F805 51               LR      1,A         SET COUNTER
0023 F806 20 FF             LI      H'FF'
0024 F808 17     CLR1       ST
0025 F809 31                DS      1           STORE FF
                                                DECREMENT COUNTER
0026 F80A 94 FD             BNZ     CLR1        DONE?
0027 F80C 1C                POP                 YES--RETURN
0028        ************************************************
0029 F80D 0F     INIT       LR      DC,0        GET ORIGIN ADDRESS
002A F80E 16                LM                  GET CONTENTS SAME
002B F80F 0E                LR      0,DC        SAVE NEW ORIGIN
002C F810 10                LR      DC,H        GET DEST. ADDRESS
002D F811 17                ST                  TRANSFER BYTE
002E F812 11                LR      H,DC        SAVE NEW DEST.
002F F813 31                DS      1           DECREMENT COUNTER
0030 F814 94 F8             BNZ     INIT        TRANSFER DONE?
0031 F816 1C                POP                 YES--RETURN
0032        ************************************************
0033 F817 08     INTS       LR      K,P         SAVE RETURN ADDR.
0034 F818 28 F8 00          PI      CLER        CLEAR REGISTERS
0035 F81B 20 60             LI      H'60'       SET TRANSFER COUNT
0036 F81D 51                LR      1,A         AND STORE IN 1
0037 F81E 2A 08 00          DCI     H'800'
0038 F821 11                LR      H,DC        SET DEST. ADDRESS
0039 F822 28 F8 0D          PI      INIT
003A F825 20 10             LI      H'10'
003B F827 8E                ADC
003C F828 11                LR      H,DC        Y L.O.A LOAD
003D F829 51                LR      1,A         TRANSFER COUNT
003E F82A 28 F8 0D          PI      INIT
003F F82D 2A 08 F0          DCI     H'8F0'
0040 F830 11                LR      H,DC
0041 F831 77                LIS     H'7'
0042 F832 51                LR      1,A
0043 F833 28 F8 0D          PI      INIT        SET SELECTED REGS.
0044 F836 0C                PK                  AND RETURN
```

```
0045                          ++++++++++++++++++++++++++++++++++++++++++
0046 F837 2A 08 FB   SYNC     DCI     H'8FB'
0047 F83A 16                  LM              GET LINE NUMBER
0048 F83B 25 0D               CI      H'D'
0049 F83D 94 F9               BNZ     SYNC    ARE WE AT LINE D?
004A F83F 1C                  POP             YES--RETURN.
004B                          ++++++++++++++++++++++++++++++++++++++++++
004C              X            EQU     H'0'
004D              VX           EQU     H'1'
004E              Y            EQU     H'2'
004F              VY           EQU     H'3'
0050              VYP          EQU     H'4'
0051              SCOR         EQU     H'5'
0052              PSTA         EQU     H'6'
0053              SCAD         EQU     H'7'
0054              TEMP         EQU     H'9'
0055              TMP2         EQU     H'A'
0056              TMP3         EQU     H'B'
0057              HU           EQU     H'A'
0058              HL           EQU     H'B'
0059                           ORG     H'F900'
005A F900 2A 08 F7             DCI     H'8F7'
005B F903 70                   CLR             CLEAR ACCUMULATOR
005C F904 17                   ST              DISABLE DMA+VIDEO
005D F905 2A 12 30             DCI     H'1230'     START INIT. DATA
005E F908 0E                   LR      Q,DC    INTO REGISTER Q
005F F909 28 F8 17             PI      INTS    INITIALIZE REGISTERS
0060 F90C 70                   LIS     H'0'    CLEAR ACC
0061 F90D 55                   LR      SCOR,A  CLEAR SCORE REGISTER
0062 F90E 66                   LISU    6
0063 F90F 68                   LISL    0
0064 F910 5C                   LR      S,A     SET HEX SCORE TO ZERO
0065 F911 64                   LISU    4       H'20'=BALL CNTR REGISTER
0066 F912 75                   LIS     H'5'
0067 F913 5C                   LR      S,A     SET FOR FIVE BALLS
0068 F914 6C                   LISL    4
0069 F915 70                   LIS     H'0'
006A F916 5C                   LR      S,A     SET INIT. FIN.MOD REG(PRG COPY)
006B F917 63       LOOP        LISU    3
006C F918 68                   LISL    0
006D F919 28 F8 37             PI      SYNC
006E F91C 2A 08 FA             DCI     H'8FA'
006F F91F 70                   CLR
0070 F920 8C                   XM              ODD/NULL EVEN W/STATUS
0071 F921 91 F5                BM      LOOP
0072 F923 20 44                LI      H'44'   PROPERLY SYNCHED
0073 F925 2A 08 F7             DCI     H'8F7'
0074 F928 17                   ST
0075 F929 5C                   LR      S,A     SET COMMAND REGISTER
0076 F92A 65                   LISU    5
0077 F92B 78                   LIS     H'8'    SET CENTRAL BUMPER
0078 F92C 5C                   LR      S,A     COLOR CHANGE TIMER
0079 F92D 70                   LIS     H'0'
007A F92E B0                   OUTS    0       CLEAR BUTTON PORT
007B F92F 20 3A                LI      H'3A'   INIT Y COORD
007C F931 52                   LR      Y,A     INTO Y
007D F932 20 7E                LI      H'7E'
007E F934 50                   LR      X,A     STORE INIT X
007F F935 71                   LIS     H'1'
0080 F936 51                   LR      VX,A
0081 F937 70                   LIS     H'0'
0082 F938 53                   LR      VY,A
0083 F939 54                   LR      VYP,A
0084 F93A 28 F9 8B  LP1        PI      CNGC    CHANGE BACKGRND TO RED
0085 F93D A0                   INS     0       GET INPUT
0086 F93E 94 0C                BNZ     LP2     IS THERE ANY?
0087 F940 28 F9 A7             PI      UPDX    NO--UPDATE X COORD
0088 F943 28 F9 96             PI      CNGB    CHANGE COLOR TO PURPLE
0089 F946 28 FD 1A             PI      CENB    CHECK FOR BUMPER COLOR CHANGE
008A F949 90 F0                BR      LP1     AND LOOP BACK
008B F94B 59       LP2         LR      TEMP,A  LOAD INPUT IN TEMP
008C F94C 28 F9 9D             PI      PACK            THEN PACK IT
008D F94F 28 F9 F2 LP3         PI      UDO     UPDATE FALLING BALL
008E F952 28 F9 D7             PI      DSPY    MATCH INACTIVE TO ACTIVE LIST
008F F955 28 F9 BC             PI      FILL    PUT X & Y CURRENT ON LIST
```

```
0090 F958 28 FB AC        PI    SORT    SORT INACTIVE LIST
0091 F95B 28 F9 96        PI    CNGB    SYNCHRONIZE&SWITCH BACKGROUND
0092 F95E 28 FD 1A        PI    CENB    CHECK FOR BUMPER COLOR CHANGE
0093 F961 28 FC 0D        PI    SCHD    UPDATE SCORE
0094 F964 28 FB 3E        PI    PADC    SET PADDLES
0095 F967 63              LISU  3
0096 F968 68              LISL  0
0097 F969 4C              LR    A,S     GET PROGRAM COMREG
0098 F96A 23 40           XI    H'40'   COMPLEMENT A/NULL B
0099 F96C 2A 08 F7        DCI   H'8F7'
009A F96F 17              ST
009B F970 5C              LR    S,A
009C F971 28 F9 8B        PI    CNGC    CHANGE COLOR RED
009D F974 28 FC AA        PI    FLSH    FLASH IF COLLISION
009E F977 A0              INS   0       GET INPUT (IF ANY)
009F F978 94 D2           BNZ   LP2     IS THERE ANY?
00A0 F97A 70              LIS   H'0'    NO.CLEAR PSTA
00A1 F97B 56              LR    PSTA,A
00A2 F97C 90 D2           BR    LP3     AND CONTINUE
00A3 F97E 2A 08 FB CLRS   DCI   H'8FB'
00A4 F981 16              LM            GET LINE NUMBER
00A5 F982 E9              XS    TEMP
00A6 F983 94 FA           BNZ   CLRS    AT DESIRED LINE?
00A7 F985 2A 08 F5        DCI   H'8F5'  YES.
00A8 F988 4A              LR    A,TMP2  GET NEW BACKGROUND
00A9 F989 17              ST            STORE IT
00AA F98A 1C              POP           AND RETURN
00AB F98B 08       CNGC   LR    K,P     SAVE RETURN ADDRESS
00AC F98C 20 38           LI    H'38'
00AD F98E 59              LR    TEMP,A
00AE F98F 20 11           LI    H'11'   BACKGROUND RED
00AF F991 5A       CNG1   LR    TMP2,A
00B0 F992 28 F9 7E        PI    CLRS
00B1 F995 0C              PK            AND RETURN
00B2 F996 08       CNGB   LR    K,P
00B3 F997 78              LIS   H'8'    LINE FOR CHANGE
00B4 F998 59              LR    TEMP,A
00B5 F999 20 1D           LI    H'1D'   BACKGRND PURPLE
00B6 F99B 90 F5           BR    CNG1
00B7 F99D 49       PACK   LR    A,TEMP
00B8 F99E 12              SR    1
00B9 F99F 5A              LR    TMP2,A  BIT 1=PADDLE RIGHT
00BA F9A0 49              LR    A,TEMP
00BB F9A1 21 01           NI    H'1'
00BC F9A3 15              SL    4
00BD F9A4 EA              XS    TMP2    BIT 0=PADDLE LEFT
00BE F9A5 56              LR    PSTA,A  STORE PACKED
00BF F9A6 1C              POP           AND RETURN
00C0 F9A7 08       UPDX   LR    K,P     SAVE RETURN ADDRESS
00C1 F9A8 4C              LR    A,X
00C2 F9A9 C1              AS    VX
00C3 F9AA 50              LR    X,A
00C4 F9AB 25 5C           CI    D'92'
00C5 F9AD 92 07           BNC   UPD2    AT LEFT BNDRY?
00C6 F9AF 28 FC A5 UPD1   PI    VXCH    YES.
00C7 F9B2 29 F9 D1        JMP   FL3
00C8 F9B5 25 A0    UPD2   CI    D'160'
00C9 F9B7 92 F7           BNC   UPD1    AT RT BNDRY?
00CA F9B9 29 F9 D1        JMP   FL3     NO.RESET X AND RETURN
00CB F9BC 08       FILL   LR    K,P     SAVE RETURN
00CC F9BD 28 FB 9B        PI    PREP
00CD F9C0 0F       FL1    LR    DC,Q
00CE F9C1 16              LM
00CF F9C2 25 0F           CI    H'F'
00D0 F9C4 2C              XDC           SAVE X ORDER POINTER
00D1 F9C5 10              LR    DC,H    GET Y L.O.PTR
00D2 F9C6 16              LM            INCREMENT IT
00D3 F9C7 84 06           BZ    FL2     OBJ#=BALL'S?
00D4 F9C9 11              LR    H,DC    NO.UPDATE H&Q
00D5 F9CA 2C              XDC
00D6 F9CB 0E              LR    Q,DC
00D7 F9CC 90 F3           BR    FL1
00D8 F9CE 10       FL2    LR    DC,H    Y L.O. BALL PTR
00D9 F9CF 42              LR    A,Y
00DA F9D0 17              ST            UPDATE Y
00DB F9D1 40       FL3    LR    A,X
00DC F9D2 2A 08 4F        DCI   H'84F'
```

```
00DD F9D5 17                  ST                        UPDATE X
00DE F9D6 0C                  PK                        AND RETURN
00DF F9D7 08       DSPY       LR      K,P
00E0 F9D8 28 FB 29            PI      ACT               ACTIVE IN Q, INACTIVE IN H
00E1 F9DB 41                  LR      A,VX              GET VX
00E2 F9DC 58                  LR      8,A               SAVE IN REG 8
00E3 F9DD 20 10               LI      H'10'
00E4 F9DF 51                  LR      1,A               SET TRANSFER COUNT
00E5 F9E0 28 F8 0D            PI      INIT              TRANSFER
00E6 F9E3 20 10               LI      H'10'
00E7 F9E5 10                  LR      DC,H
00E8 F9E6 8E                  ADC
00E9 F9E7 11                  LR      H,DC              XORD INACTIVE PNTR
00EA F9E8 0F                  LR      DC,Q
00EB F9E9 8E                  ADC
00EC F9EA 0E                  LR      Q,DC              XORD ACTIVE PNTR
00ED F9EB 51                  LR      1,A               TRANSFER COUNT
00EE F9EC 28 F8 0D            PI      INIT              TRANSFER
00EF F9EF 48                  LR      A,8               GET VX
00F0 F9F0 51                  LR      VX,A              RESTORE IT
00F1 F9F1 0C                  PK                        AND RETURN
00F2 F9F2 08       UD0        LR      K,P               SET ADDRESS FOR RETURN
00F3 F9F3 62                  LISU    2                 SET ISAR FOR TBCL OFFSETS
00F4 F9F4 68                  LISL    0
00F5 F9F5 44       UD         LR      A,VYP             GET L.O. BITS FOR VY
00F6 F9F6 24 01               AI      H'1'              ADD ACCELERATION
00F7 F9F8 54                  LR      VYP,A             SAVE RESULTS
00F8 F9F9 92 06               BNC     UD1               IF CARRY, MUST INCR. H.O. VY BIT
00F9 F9FB 43                  LR      A,VY
00FA F9FC 24 10               AI      H'10'
00FB F9FE 90 07               BR      UD2
00FC FA00 14       UD1        SR      4
00FD FA01 59                  LR      TEMP,A            SAVE NEW VY LO BITS
00FE FA02 43                  LR      A,VY              GET VY
00FF FA03 21 F0               NI      H'F0'             CLEAR ALL SAVE H.O.BITS
0100 FA05 C9                  AS      TEMP              AND CALCULATE NEW VY
0101 FA06 53       UD2        LR      VY,A              SAVE RESULT AND
0102 FA07 C2                  AS      Y                 UPDATE THE Y COORD.
0103 FA08 25 38               CI      H'38'
0104 FA0A 92 07               BNC     UD3               ABOVE TOP BOUNDARY?
0105 FA0C 20 39               LI      H'39'             YES.
0106 FA0E 52                  LR      Y,A               SET NEW Y,
0107 FA0F 29 FC 9E            JMP     VYCH              COMPLEMENT VY & RETURN
0108 FA12 25 F0    UD3        CI      H'F0'             BELOW BOTTOM BOUNDARY?
0109 FA14 82 04               BC      UD4
010A FA16 29 FC BD            JMP     RSET              RESET OR END GAME
010B FA19 52       UD4        LR      Y,A               NO. SAVE Y COORD.
010C FA1A 40                  LR      A,X               GET X COORD.
010D FA1B C1                  AS      VX                UPDATE IT
010E FA1C 50                  LR      X,A               AND STORE IT
010F FA1D 25 15               CI      H'15'
0110 FA1F 92 09               BNC     UD5               OFF LEFT BOUNDARY?
0111 FA21 20 16               LI      H'16'             YES.
0112 FA23 50                  LR      X,A
0113 FA24 28 FC A5            PI      VXCH              COMPLEMENT VX
0114 FA27 90 0B               BR      UD6
0115 FA29 25 DF    UD5        CI      H'DF'
0116 FA2B 82 07               BC      UD6               OFF RT BNDRY?
0117 FA2D 20 DE               LI      H'DE'             YES
0118 FA2F 50                  LR      X,A
0119 FA30 28 FC A5            PI      VXCH
011A FA33 42       UD6        LR      A,Y               GET Y COORD
011B FA34 25 75               CI      D'117'
011C FA36 92 35               BNC     EDPT+2            Y G.T. 117?
011D FA38 25 4B               CI      D'75'             NO--POSSIBLE OBJ 8-11 COLLISIONS
011E FA3A 82 23               BC      UDRT              Y L.E. 76?
011F FA3C 25 5C    UD8        CI      D'92'             NO. POSSIBLE COLLISIONS
0120 FA3E 82 20               BC      UDC               Y G.T. 92?
0121 FA40 25 63               CI      D'99'             YES.
0122 FA42 82 1B               BC      UDRT              Y G.T. 92 & L.E. 100?
0123 FA44 73       UD9        LIS     H'3'              NO. CAN HAVE COLLISION
0124 FA45 59                  LR      TEMP,A            SET POSSIBLE SCORE ADD
0125 FA46 70                  CLR                       CLEAR ACCUMULATOR
0126 FA47 E0                  XS      X                 GET X WITH STATUS IN
0127 FA48 2A 6B 2F            DCI     H'6B2F'           SET DCO FOR OBJ 8 CHECK
0128 FA4B 81 04               BP      UDB               CHECK OBJ 11 INSTEAD?
0129 FA4D 20 98               LI      H'98'             YES, SET X COORD OFFSET
012A FA4F 8E       UDA        ADC
```

```
012B FA50 0E          UDB   LR    Q,DC        QL=X COORD, QU=Y COORD
012C FA51 20 12             LI    H'12'       X OFFSET FOR RT COL.
012D FA53 5D                LR    I,A         STORE IN SCRATCH 20(OCTAL)
012E FA54 7A                LIS   H'A'        Y OFFSET FOR BOTTOM COLLIS.
012F FA55 5E                LR    D,A         ST. IN SCR 21 & RESET ISAR
0130 FA56 28 FC 5A          PI    TBCL        CHECK FOR COLLISION
0131                     * CHECK FOR POSSIBLE CENTRAL BUMPER COLLISION
0132                     *
0133 FA59 42                LR    A,Y         GET Y COORDINATE
0134 FA5A 25 73             CI    D'115'      TOPSIDE DANGER POINT
0135 FA5C 92 12             BNC   UDCK        CHECK IF Y>115
0136                     *
0137 FA5E 0C          UDRT  PK                DONE, SO RETURN
0138 FA5F 72          UDC   LIS   H'2'
0139 FA60 59                LR    TEMP,A      SET POSSIBLE SCORE ADD
013A FA61 70                CLR
013B FA62 E0                XS    X           GET X WITH STATUS IN
013C FA63 2A 53 47          DCI   H'5347'     SET DCO FOR OBJ 9
013D FA66 81 E9             BP    UDB         CHECK OBJ 10 INSTEAD?
013E FA68 20 6A             LI    H'6A'       YES, SET OFFSET
013F FA6A 90 E4       EDPT  BR    UDA         AND GO ADD IT IN
0140 FA6C 29 FA 6F          JMP   UDCK
0141 FA6F 42          UDCK  LR    A,Y         GET Y COORDINATE
0142 FA70 25 89             CI    D'137'      BOTTOMSIDE CEN.BUMP.DANGER PT.
0143 FA72 92 15             BNC   UD10        CHECK OBJ 13?
0144 FA74 70                LIS   H'0'        YES. SET POSSIBLE
0145 FA75 59                LR    TEMP,A      SCORE ADD
0146 FA76 2A 7B 79          DCI   H'7B79'     SET X&Y COORDS,TEST OBJECT
0147 FA79 0E                LR    Q,DC        QU=Y COORD, QL=X COORD
0148 FA7A 20 12             LI    H'12'       WIDTH OF TEST OBJECT
0149 FA7C 5D                LR    I,A         INTO SCRATCH 20(OCTAL)
014A FA7D 7E                LIS   H'E'        HEIGHT OF TEST OBJECT
014B FA7E 5E                LR    D,A         INTO SCRATCH 21
014C FA7F 28 FC 5A          PI    TBCL        CHECK ON COLLISION
014D                     * CHECK FOR POSSIBLE LOWER BUMPER COLLISIONS...
014E                     * (NECESSARY IF THE BALL IS STRADDLING BOTH THE
014F                     * CENTRAL BUMPER LOWSIDE DANGER POINT, AND THE
0150                     * HIGHSIDE DANGER POINT OF THE TOP TWO OF THE BOTTOM
0151                     * BUMPERS).
0152                     *
0153 FA82 42                LR    A,Y         GET Y COORDINATE
0154 FA83 25 88             CI    D'136'      HIGHSIDE DANGER POINT,LOW BUMPERS
0155 FA85 92 02             BNC   UD10        IF Y>136,MUST CHECK
0156                     *
0157 FA87 0C                PK                AND RETURN
0158 FA88 71          UD10  LIS   H'1'
0159 FA89 59                LR    TEMP,A      SET POSSIBLE SCORE ADD
015A FA8A 20 1A             LI    H'1A'       WIDTH AND HEIGHT OF BUMPERS
015B FA8C 5D                LR    I,A         STORE IN SCRATCH 20(OCTAL)
015C FA8D 5E                LR    D,A         AND 21(OCTAL)&RESET ISAR
015D FA8E 42                LR    A,Y         GET Y COORD
015E FA8F 25 A7             CI    D'167'
015F FA91 92 15             BNC   UD12        Y L.E. 167?
0160 FA93 2A 8F 13  UDL0    DCI   H'8F13'     YES.SET FOR OBJ 2 CHECK
0161 FA96 70                CLR               CLEAR ACC
0162 FA97 E0                XS    X           GET X WITH STATUS
0163 FA98 81 04             BP    UD11        CHECK OBJ 7 INSTEAD?
0164 FA9A 20 C4             LI    H'C4'       YES.
0165 FA9C 8E                ADC
0166 FA9D 0E          UD11  LR    Q,DC        QL=X,QU=Y COORDS OF BUMPER
0167 FA9E 28 FC 5A          PI    TBCL        CHECK FOR COLLISION
0168 FAA1 42                LR    A,Y
0169 FAA2 25 A0             CI    D'160'
016A FAA4 92 02             BNC   UD12        Y L.E. 160?
016B FAA6 0C                PK                YES, NO OTHER COLLISIONS POSSIBLE
016C FAA7 25 BF       UD12  CI    D'191'      Y G.T. 160. CHECK OBJ 3&6
016D FAA9 92 1E             BNC   UD14        Y L.E. 191?
016E FAAB 2A A7 2B  UDL1    DCI   H'A72B'     YES.SET FOR OBJ 3
016F FAAE 70                CLR               CLEAR ACC
0170 FAAF E0                XS    X           X IN WITH STATUS
0171 FAB0 81 04             BP    UD13        CHECK OBJECT 6 INSTEAD?
0172 FAB2 20 94             LI    H'94'       YES.
0173 FAB4 8E                ADC
0174 FAB5 0E          UD13  LR    Q,DC
0175 FAB6 28 FC 5A          PI    TBCL        CHECK FOR COLLISION
0176 FAB9 40                LR    A,X
0177 FABA 25 2B             CI    D'43'     * IF X L.E. 43, RECHECK FOR
0178 FABC 82 D6             BC    UDL0        POSSIBLE OBJ 2 COLLISION
```

```
0179 FABE 25 D0              CI    D'208'    IF X G.T. 208, RECHECK FOR
017A FAC0 92 D2              BNC   UDL0      POSSIBLE OBJ 7 COLLISION
017B FAC2 42                 LR    A,Y
017C FAC3 25 B7              CI    H'B7'
017D FAC5 92 02              BNC   UD14      Y L.E. H'B8'=D'184'?
017E FAC7 0C                 PK              YES, SO NO COLLISIONS LEFT.
017F FAC8 25 D7     UD14     CI    D'215'    CHECK OBJ 4&5
0180 FACA 92 18              BNC   UDEP+2    IF Y G.T. 215,ONLY PADDLE CAN HIT
0181 FACC 2A BF 43           DCI   H'BF43'   SET FOR OBJECT 4
0182 FACF 70                 CLR             CLEAR ACC
0183 FAD0 E0                 XS    X         GET X IN WITH STATUS
0184 FAD1 81 04              BP    UD15      CHECK OBJ 5 INSTEAD?
0185 FAD3 20 64              LI    H'64'     YES
0186 FAD5 8E                 ADC
0187 FAD6 0E        UD15     LR    Q,DC
0188 FAD7 28 FC 5A           PI    TBCL      CHECK FOR COLLISION
0189 FADA 40                 LR    A,X
018A FADB 25 43              CI    D'67'     X L.E. 67? IF SO, RECHECK FOR
018B FADD 82 CD              BC    UDL1      POSSIBLE OBJ 3 COLLISION
018C FADF 25 B8              CI    D'184'    IF X G.T. 184, RECHECK FOR
018D FAE1 92 C9     UDEP     BNC   UDL1      POSSIBLE OBJECT 6 COLLISION
018E FAE3 29 FA E6           JMP   UDP
018F FAE6 42        UDP      LR    A,Y       GET Y COORD
0190 FAE7 25 D0              CI    H'D0'
0191 FAE9 82 2A              BC    PPUP      Y>H'D0'?
0192 FAEB 25 EC              CI    H'EC'     YES.
0193 FAED 92 26              BNC   PPUP      Y L.E. H'EC'?
0194 FAEF 28 FB 15           PI    UPAK      UNPACK PADDLE STATUS
0195 FAF2 2A D9 57           DCI   H'D957'   SET FOR OBJ 12 CHECK
0196 FAF5 28 FB 22           PI    STA1      SET WIDTH FOR STATUS=1
0197 FAF8 70                 CLR             CLEAR ACCUMULATOR
0198 FAF9 E0                 XS    X         X COORD IN WITH STATUS
0199 FAFA 81 0F              BP    UDP3      CHECK OBJ 14 INSTEAD?
019A FAFC 20 3C              LI    H'3C'     YES.
019B FAFE 8E                 ADC             RESET XCOB FOR OBJ 14 IN STATUS 1
019C FAFF 70                 CLR             CLEAR ACCUMULATOR
019D FB00 EB                 XS    TMP3      GET STATUS OF OBJ 14
019E FB01 94 0C              BNZ   UDP4      STATUS=0?
019F FB03 78                 LIS   H'8'      YES.
01A0 FB04 8E                 ADC             RESET X COORD FOR STATUS=0
01A1 FB05 28 FB 1D UDP2      PI    STA0      RESET XCOB FOR STATUS 0
01A2 FB08 90 05              BR    UDP4
01A3 FB0A 70        UDP3     CLR             CLEAR ACC
01A4 FB0B EA                 XS    TMP2      GET STATUS OF OBJ 12
01A5 FB0C 84 F8              BZ    UDP2      IF STATUS=0,RESET WIDTH
01A6 FB0E 70        UDP4     LIS   H'0'
01A7 FB0F 59                 LR    TEMP,A    SET POSSIBLE SCORE ADD.
01A8 FB10 0E                 LR    Q,DC      QU=Y COORD, QL=X COORD
01A9 FB11 28 FC 5A           PI    TBCL      CHECK FOR COLLISION
01AA FB14 0C        PPUP     PK              AND RETURN
01AB FB15 46        UPAK     LR    A,PSTA
01AC FB16 14                 SR    4
01AD FB17 5A                 LR    TMP2,A
01AE FB18 46                 LR    A,PSTA
01AF FB19 21 01              NI    H'1'
01B0 FB1B 5B                 LR    TMP3,A
01B1 FB1C 1C                 POP
01B2 FB1D 20 10     STA0     LI    H'10'     STATUS 0 WIDTH
01B3 FB1F 5D                 LR    I,A       IN SCRATCH 20
01B4 FB20 90 04              BR    STA2
01B5 FB22 20 18     STA1     LI    H'18'     STATUS 1 WIDTH
01B6 FB24 5D                 LR    I,A       IN SCRATCH 20
01B7 FB25 20 14     STA2     LI    H'14'     HEIGHT IN EITHER STATUS
01B8 FB27 5E                 LR    D,A       INTO 21 AND RESET ISAR
01B9 FB28 1C                 POP             RETURN
01BA FB29 2A 08 50 ACT       DCI   H'850'
01BB FB2C 11                 LR    H,DC
01BC FB2D 63                 LISU  3
01BD FB2E 68                 LISL  0
01BE FB2F 4C                 LR    A,S       GET PROG COMREG
01BF FB30 18                 COM
01C0 FB31 21 40              NI    H'40'
01C1 FB33 12                 SR    1
01C2 FB34 12                 SR    1
01C3 FB35 8E                 ADC             Y L.O.ACTIVE ADDR
```

```
01C4 FB36 0E              LR    0,DC       STORE IN REG 0
01C5 FB37 18              COM
01C6 FB38 21 10           NI    H'10'
01C7 FB3A 10              LR    DC,H
01C8 FB3B 8E              ADC              Y L.O. INACTIVE ADDR
01C9 FB3C 11              LR    H,DC       STORE IN REG H
01CA FB3D 1C              POP              AND RETURN
01CB FB3E 08       PADC   LR    K,P        SAVE RETURN ADDRESS
01CC FB3F 28 FB 15        PI    UPAK       UNPACK PADDLE STATUS
01CD FB42 70              CLR              CLEAR ACCUMULATOR
01CE FB43 EA              XS    TMP2       LEFT PADDLE STATUS IN
01CF FB44 94 23           BNZ   PAD4       STATUS=1?
01D0 FB46 28 FB 75        PI    ST0        NO.
01D1 FB49 28 FB 87 PAD2   PI    UDPL       UPDATE LEFT PADDLE PNTRS
01D2 FB4C 28 FB 7E        PI    ST1        ASSUME RT PADDLE STATUS=1
01D3 FB4F 20 2A           LI    H'2A'
01D4 FB51 C8              AS    8
01D5 FB52 58              LR    8,A        OFFSET ADDRESS FOR RT PAD IMAGE
01D6 FB53 70              CLR              CLEAR ACCUMULATOR
01D7 FB54 EB              XS    TMP3       RT PADDLE STATUS IN
01D8 FB55 94 17           BNZ   PAD5       STATUS REALLY=1?
01D9 FB57 2A 08 49        DCI   H'849'     NO. SET X COORD
01DA FB5A 20 A0           LI    H'A0'      OF RIGHT PADDLE
01DB FB5C 17              ST               ACCORDINGLY
01DC FB5D 28 FB 75        PI    ST0        SET POINTERS FOR STATUS=0
01DD FB60 20 2A           LI    H'2A'
01DE FB62 C8              AS    8
01DF FB63 58              LR    8,A        AND OFFSET FOR RT PADDLE
01E0 FB64 28 FB 8C PAD3   PI    UDPR       UPDATE RT PADDLE PNTRS
01E1 FB67 0C              PK               AND RETURN
01E2 FB68 28 FB 7E PAD4   PI    ST1
01E3 FB6B 90 DD           BR    PAD2
01E4 FB6D 2A 08 49 PAD5   DCI   H'849'     SET X COORD OF
01E5 FB70 20 98           LI    H'98'      RT PADDLE FOR STATUS
01E6 FB72 17              ST               ONE MODE
01E7 FB73 90 F0           BR    PAD3
01E8 FB75 70       ST0    LIS   H'0'
01E9 FB76 58              LR    8,A
01EA FB77 20 61           LI    H'61'
01EB FB79 59              LR    TEMP,A
01EC FB7A 20 14           LI    H'14'
01ED FB7C 5A              LR    TMP2,A
01EE FB7D 1C              POP
01EF FB7E 20 17    ST1    LI    H'17'
01F0 FB80 58              LR    8,A
01F1 FB81 20 62           LI    H'62'
01F2 FB83 59              LR    TEMP,A
01F3 FB84 78              LIS   H'8'
01F4 FB85 5A              LR    TMP2,A
01F5 FB86 1C              POP
01F6 FB87 2A 08 07 UDPL   DCI   H'807'
01F7 FB8A 90 04           BR    UDPD
01F8 FB8C 2A 08 09 UDPR   DCI   H'809'
01F9 FB8F 48       UDPD   LR    A,8
01FA FB90 17              ST
01FB FB91 20 1F           LI    H'1F'
01FC FB93 8E              ADC
01FD FB94 49              LR    A,TEMP
01FE FB95 17              ST
01FF FB96 7F              LIS   H'F'
0200 FB97 8E              ADC
0201 FB98 4A              LR    A,TMP2
0202 FB99 17              ST
0203 FB9A 1C              POP
0204 FB9B 2A 08 50 PREP   DCI   H'850'
0205 FB9E 63              LISU  3
0206 FB9F 68              LISL  0
0207 FBA0 4C              LR    A,S        GET PROG COMREG
0208 FBA1 21 40           NI    H'40'      EXTRACT A/NULL B BIT
0209 FBA3 12              SR    1
020A FBA4 12              SR    1          NOW HAVE OFFSET TO INACTIVE LIST
020B FBA5 8E              ADC              SET DC0 TO Y L.O. INACTIVE
020C FBA6 11              LR    H,DC       AND SAVE IN H
020D FBA7 20 20           LI    H'20'
020E FBA9 8E              ADC              DC0 TO Y H.O.+X ORDER INACTIVE
```

```
020F FBAA 0E              LR     Q,DC
0210 FBAB 1C              POP
0211 FBAC 08       SORT   LR     K,P       SET ADDRESS FOR RETURN
0212 FBAD 28 FB 9B        PI     PREP
0213 FBB0 10       SRT1   LR     DC,H      Y L.O.
0214 FBB1 2C              XDC
0215 FBB2 0F              LR     DC,Q      X ORDER
0216 FBB3 20 10           LI     H'10'
0217 FBB5 59              LR     TEMP,A    SET COUNTER
0218 FBB6 39       SRT2   DS     TEMP      DECREMENT COUNTER
0219 FBB7 16              LM               GET NEXT OBJ NUMBER
021A FBB8 25 0F           CI     H'F'      COMPARE WITH BALL'S OBJ. NO
021B FBBA 2C              XDC
021C FBBB 16              LM
021D FBBC 2C              XDC              INCR. H&RESTORE
021E FBBD 94 F8           BNZ    SRT2      OBJ#=BALL'S?
021F FBBF 0E              LR     Q,DC      YES.DCO=1 PAST XORD BALL
0220 FBC0 2C              XDC
0221 FBC1 11              LR     H,DC      AND H=1 PAST Y L.O. BALL
0222 FBC2 4B              LR     A,HL      GET HL
0223 FBC3 24 FE           AI     H'FE'
0224 FBC5 5B              LR     HL,A      H=1 BEFORE Y L.O. BALL NOW
0225 FBC6 49              LR     A,TEMP    GET COUNTER
0226 FBC7 25 0F           CI     H'F'
0227 FBC9 84 3C           BZ     SRT5      BALL LOWEST ON LIST?
0228 FBCB 03              LR     A,QL      NO.GET L.O.BITS OF XORDER ADDR.
0229 FBCC 24 FE           AI     H'FE'
022A FBCE 07              LR     QL,A      NOW POINTS 1 BEFORE XORD BALL
022B FBCF 0F              LR     DC,Q      LOAD DCO
022C FBD0 16              LM               GET OBJ# PRECEEDING OBJ ON LIST
022D FBD1 2A 08 40        DCI    H'840'
022E FBD4 8E              ADC              DCO TO X COORD, THIS OBJECT
022F FBD5 16              LM               NOW HAVE ITS X COORD
0230 FBD6 18              COM
0231 FBD7 1F              INC
0232 FBD8 C0              AS     X
0233 FBD9 92 1A           BNC    EXC1      IF XBALL<XOB,EXCHANGE BACK
0234 FBDB 70              CLR              CLEAR ACCUMULATOR
0235 FBDC E9              XS     TEMP      COUNTER IN WITH STATUS
0236 FBDD 84 12           BZ     SRTD      IF BALL HIGHEST ON LIST--DONE.
0237 FBDF 0F       SRT3   LR     DC,Q      DCO POINTS TO OBJ# PREC. BALL
0238 FBE0 16              LM
0239 FBE1 0E              LR     Q,DC      Q POINTS TO XORDER BALL
023A FBE2 16       SRT4   LM
023B FBE3 16              LM               GET OBJ# FOLLOWING BALL
023C FBE4 2A 08 40        DCI    H'840'
023D FBE7 8E              ADC              AND DCO POINTS TO ITS X COORD
023E FBE8 16              LM               GET IT
023F FBE9 59              LR     TEMP,A    SAVE IT
0240 FBEA 40              LR     A,X       GET X BALL
0241 FBEB 18              COM
0242 FBEC 1F              INC
0243 FBED C9              AS     TEMP
0244 FBEE 92 02           BNC    EXC2      IF XOB <XBALL EXCHANGE FORWARD
0245 FBF0 0C       SRTD   PK               OTHERWISE, RETURN
0246 FBF1 4B       EXC2   LR     A,HL      GET HL
0247 FBF2 1F              INC              INCREMENT IT
0248 FBF3 5B              LR     HL,A      AND STORE
0249 FBF4 28 FB FD EXC1   PI     SWIT      SWITCH X ORDERS
024A FBF7 10              LR     DC,H
024B FBF8 0E              LR     Q,DC
024C FBF9 28 FB FD        PI     SWIT      SWITCH Y L.O.
024D FBFC 0C              PK               AND RETURN
024E FBFD 0F       SWIT   LR     DC,Q      GET START ADDRESS
024F FBFE 16              LM               AND CONTENTS SAME
0250 FBFF 59              LR     TEMP,A    STORE TEMPORARILY
0251 FC00 16              LM               GET NEXT ITEM
0252 FC01 0F              LR     DC,Q
0253 FC02 17              ST               STORE IT IN 1ST ADDR
0254 FC03 49              LR     A,TEMP
0255 FC04 17              ST               COMPLETE SWITCH
0256 FC05 1C              POP              AND RETURN
0257 FC06 03       SRT5   LR     A,QL
0258 FC07 24 FF           AI     H'FF'
0259 FC09 07              LR     QL,A      Q POINTS TO XORD BALL
```

```
025A FC0A 0F              LR     DC,Q       AS DOES DC0
025B FC0B 90 D6            BR     SRT4       SAVE RETURN ADDRESS
025C FC0D 08      SCHD     LR     K,P
025D FC0E 70               CLR               CLEAR ACCUMULATOR
025E FC0F E7               XS     SCAD       GET SCORE ADD WITH STATUS
025F FC10 84 38            BZ     SCND       ANY CHANGE?
0260 FC12 24 66            AI     H'66'      YES
0261 FC14 D5               ASD    SCOR       CALC. NEW DECIMAL SCORE
0262 FC15 55               LR     SCOR,A     AND UPDATE SCORE REG.
0263 FC16 66               LISU   6
0264 FC17 68               LISL   0
0265 FC18 47               LR     A,SCAD     GET SCORE ADD
0266 FC19 CC               AS     S          ADD PREVIOUS HEX SCORE
0267 FC1A 5C               LR     S,A        AND UPDATE HEX SCORE
0268 FC1B 25 63            CI     H'63'
0269 FC1D 82 0E            BC     SCH1       SCORE>99 DECIMAL?
026A FC1F 24 AD            AI     H'AD'      YES.SUBTRACT D'100'
026B FC21 5C               LR     S,A        AND UPDATE THE HEX SCORE
026C FC22 64               LISU   4          NOW WE UPDATE FINAL MOD.
026D FC23 6C               LISL   4
026E FC24 4C               LR     A,S        GET PROG COPY FINAL MOD REG
026F FC25 1F               INC
0270 FC26 1F               INC               INCREMENT COLOR MOD
0271 FC27 5C               LR     S,A        UPDATE PROGRAM COPY
0272 FC28 2A 08 F2         DCI    H'8F2'
0273 FC2B 17               ST                AND UPDATE UM1 COPY
0274 FC2C 45      SCH1     LR     A,SCOR     RECOVER SCORE
0275 FC2D 14               SR     4          AND UNPACK OBJECT 0 VALUE
0276 FC2E 59               LR     TEMP,A     SAVE IN TEMP
0277 FC2F 28 FC 4A         PI     SET        SET NEW OBJ 0 ADDR IN H
0278 FC32 10               LR     DC,H
0279 FC33 0E               LR     Q,DC       TRANSFER TO Q REGISTER
027A FC34 45               LR     A,SCOR
027B FC35 15               SL     4
027C FC36 14               SR     4          UNPACK OBJ 1 VALUE
027D FC37 59               LR     TEMP,A     SAVE IN TEMP
027E FC38 28 FC 4A         PI     SET        SET NEW VALUE IN H
027F FC3B 2A 08 00         DCI    H'800'
0280 FC3E 03               LR     A,QL
0281 FC3F 17               ST                SET NEW L.O. ROM, OBJ0
0282 FC40 4B               LR     A,HL
0283 FC41 17               ST                SET NEW L.O. ROM, OBJ1
0284 FC42 2A 08 10         DCI    H'810'
0285 FC45 02               LR     A,QU
0286 FC46 17               ST                SET NEW H.O. ROM+COLOR,OBJ0
0287 FC47 4A               LR     A,HU
0288 FC48 17               ST                SET NEW H.O. ROM+COLOR,OBJ1
0289 FC49 0C      SCND     PK                AND RETURN
028A FC4A 2A 15 00 SET     DCI    H'1500'    START ADDR FOR NUMBERS
028B FC4D 7F               LIS    H'F'       OFFSET BETWEEN NUMBERS
028C FC4E 84 05            BZ     S3         ALREADY HAVE ZERO?
028D FC50 8E      S2       ADC               ADD OFFSET
028E FC51 39               DS     TEMP       DECREMENT COUNTER
028F FC52 94 FD            BNZ    S2         ADDED ENOUGH OFFSETS?
0290 FC54 11      S3       LR     H,DC       YES, NUMBER READY.LOAD IN H
0291 FC55 4A               LR     A,HU       GET ROM H.O.
0292 FC56 22 E0            OI     H'E0'      TURN ON COLOR BITS
0293 FC58 5A               LR     HU,A       AND STORE RESULT.
0294 FC59 1C               POP               AND RETURN
0295 FC5A 03      TBCL     LR     A,QL       GET X COORD, TEST OBJ.
0296 FC5B 18               COM
0297 FC5C 1F               INC
0298 FC5D 5A               LR     TMP2,A     SAVE ITS NEGATIVE
0299 FC5E 40               LR     A,X        GET X COORD, BALL
029A FC5F 24 07            AI     H'7'
029B FC61 CA               AS     TMP2
029C FC62 82 02            BC     TBC1       XCOB G.T. X+7?
029D FC64 1C               POP               YES, NO COLLISION POSSIBLE
029E FC65 03      TBC1     LR     A,QL       GET X COORD, TEST OBJ.
029F FC66 CC               AS     S          ACC=XCOB+WIDTH
02A0 FC67 18               COM
02A1 FC68 1F               INC
02A2 FC69 C0               AS     X
02A3 FC6A 92 02            BNC    TBC2       XCOB+WIDTH L.E. X?
02A4 FC6C 1C               POP               YES, NO COLLISION--RETURN
```

```
02A5 FC6D 49        TBC2    LR    A,TEMP    COLLISION!
02A6 FC6E 57                LR    SCAD,A    SET SCORE ADDITION
02A7 FC6F 67                LISU  7         COLLISION FLAG IN SCRATCH O'70'
02A8 FC70 71                LIS   H'1'      SET COLLISION FLAG
02A9 FC71 5C                LR    S,A       VALUE IN
02AA FC72 62                LISU  2         RESET ISAR
02AB FC73 40                LR    A,X
02AC FC74 24 04             AI    H'4'
02AD FC76 CA                AS    TMP2
02AE FC77 82 08             BC    TBC4      XCOB G.T. X+4?
02AF FC79 03                LR    A,OL      YES, LEFT SIDE COLLISION
02B0 FC7A 24 F7             AI    H'F7'     X=XCOB-9
02B1 FC7C 50        TBC3    LR    X,A
02B2 FC7D 29 FC A5          JMP   VXCH      VX=-VX&RETURN FROM THERE
02B3 FC80 03        TBC4    LR    A,OL      GET X COORD. TEST OBJ
02B4 FC81 CC                AS    S         ACC=XCOB+WIDTH
02B5 FC82 5B                LR    TMP3,A    SAVE THIS TEMPORARILY
02B6 FC83 18                COM
02B7 FC84 1F                INC
02B8 FC85 C0                AS    X
02B9 FC86 24 04             AI    H'4'
02BA FC88 92 05             BNC   TBC5      XCOB+WIDTH L.E. X+4?
02BB FC8A 4B                LR    A,TMP3    YES,RT SIDE COLLISION
02BC FC8B 1F                INC             X=XCOB+WIDTH+1
02BD FC8C 90 EF             BR    TBC3
02BE FC8E 70        TBC5    CLR             MUST BE TOP OR BOTTOM COLLISION
02BF FC8F E3                XS    VY        GET VY IN WITH STATUS
02C0 FC90 4D                LR    A,I       ADVANCE ISAR TO OFFSET FOR BOT.COL.
02C1 FC91 02                LR    A,OU      GET YCOB
02C2 FC92 81 07             BP    TBC7      IF VY<0,BOTTOM,VY>0,TOP.
02C3 FC94 CE                AS    D         Y=YCOB+HEIGHT SAME+1,RESET ISAR
02C4 FC95 1F                INC
02C5 FC96 52        TBC6    LR    Y,A       STORE NEW Y VALUE
02C6 FC97 29 FC 9E          JMP   VYCH      VY=-VY&DONE.  VYCH RETURNS
02C7 FC9A 24 F7     TBC7    AI    H'F7'     TOP,SO Y=YCOB-9
02C8 FC9C 90 F9             BR    TBC6
02C9 FC9E 43        VYCH    LR    A,VY
02CA FC9F 18                COM
02CB FCA0 1F                INC
02CC FCA1 53                LR    VY,A
02CD FCA2 15                SL    4
02CE FCA3 54                LR    VYP,A
02CF FCA4 1C                POP
02D0 FCA5 41        VXCH    LR    A,VX
02D1 FCA6 18                COM
02D2 FCA7 1F                INC
02D3 FCA8 51                LR    VX,A
02D4 FCA9 1C                POP
02D5 FCAA 70        FLSH    CLR             CLEAR ACCUMULATOR
02D6 FCAB 67                LISU  7
02D7 FCAC 68                LISL  0         ISAR TO COLLISION FLAG
02D8 FCAD EC                XS    S         COLLISION FLAG IN W/STATUS
02D9 FCAE 70                LIS   H'0'
02DA FCAF 5C                LR    S,A       CLEAR FLAG
02DB FCB0 94 03             BNZ   F1        COLLISION?
02DC FCB2 90 04             BR    F2
02DD FCB4 29 FD 00 F1       JMP   SOND
02DE FCB7 2B        F2      NOP             NO-OPS FOR BREAKPOINTS
02DF FCB8 2B                NOP             FOR DEBUGGING.
02E0 FCB9 2B                NOP             DELETE LATER.
02E1 FCBA 2B                NOP
02E2 FCBB 2B                NOP
02E3 FCBC 1C                POP             RETURN
02E4 FCBD 20 A0     RSET    LI    H'A0'
02E5 FCBF 5B                LR    TMP3,A    SET TIME DELAY ON RESET
02E6 FCC0 28 F9 96  RST1    PI    CNGB
02E7 FCC3 28 FD 1A          PI    CENB
02E8 FCC6 28 F9 8B          PI    CNGC
02E9 FCC9 3B                DS    TMP3
02EA FCCA 94 F5             BNZ   RST1      DELAY DONE?
02EB FCCC 2A 08 F7          DCI   H'8F7'
02EC FCCF 74                LIS   H'4'      SET FOR LIST B
02ED FCD0 17                ST              BEFORE DIDDLING LIST A
02EE FCD1 64                LISU  4
02EF FCD2 68                LISL  0
```

```
02F0 FCD3 3C              DS    S           DECREMENT BALL COUNT
02F1 FCD4 94 04            BNZ   RST2        BALLS LEFT TO PLAY?
02F2 FCD6 29 F9 00         JMP   H'F900'     NO. RESET FROM START
02F3 FCD9 2A 08 1F  RST2   DCI   H'81F'
02F4 FCDC 0E               LR    Q,DC
02F5 FCDD 20 E0            LI    H'E0'
02F6 FCDF 88               AM
02F7 FCE0 0F               LR    DC,Q
02F8 FCE1 17               ST                UPDATE BALL COLOR
02F9 FCE2 2A 12 70         DCI   H'1270'     SOURCE ADDRESS
02FA FCE5 0E               LR    Q,DC        INTO REGISTER Q
02FB FCE6 2A 08 40         DCI   H'840'      DESTINATION ADDRESS
02FC FCE9 11               LR    H,DC        INTO REGISTER H
02FD FCEA 20 20            LI    H'20'       SET TRANSFER COUNT
02FE FCEC 51               LR    1,A         INTO REGISTER 1
02FF FCED 28 F8 0D         PI    INIT        RESET X VALUES AND Y L.O. A
0300 FCF0 20 10            LI    H'10'
0301 FCF2 8E               ADC
0302 FCF3 11               LR    H,DC
0303 FCF4 51               LR    1,A
0304 FCF5 28 F8 0D         PI    INIT        RESET THE XORDER A LIST
0305 FCF8 70               LIS   H'0'
0306 FCF9 56               LR    PSTA,A      CLEAR PADDLE STATUS
0307 FCFA 28 FB 3E         PI    PADC        AND RESET CORRESPONDING IMAGES
0308 FCFD 29 F9 17         JMP   LOOP        AND JUMP BACK
0309 FD00 70        SOND   CLR               CLEAR ACCUMULATOR
030A FD01 E7               XS    SCAD        SCORE ADD IN W/STATUS
030B FD02 94 02            BNZ   SN1
030C FD04 75               LIS   H'5'        PADDLE OR CENTRAL BUMPER
030D FD05 24 FF     SN1    AI    H'FF'       SET FREQUENCY
030E FD07 22 08            OI    H'8'        SET ENABLE BIT
030F FD09 B1               OUTS  1           TURN ON SOUND
0310 FD0A 20 10            LI    H'10'       OUTER LOOP REPITITIONS
0311 FD0C 5A               LR    TMP2,A      OUTER LOOP COUNTER
0312 FD0D 20 4E     SN2    LI    H'4E'       OUTER LOOP START
0313 FD0F 5B               LR    TMP3,A      INNER LOOP COUNTER
0314 FD10 3B        SN3    DS    TMP3        DECREMENT INNER COUNTER
0315 FD11 94 FE            BNZ   SN3         INNER LOOP DONE?
0316 FD13 3A               DS    TMP2        YES, DECREMENT OUTER COUNTER
0317 FD14 94 F8            BNZ   SN2         TIME TO TURN OFF SOUND?
0318 FD16 70               LIS   H'0'        YES.
0319 FD17 B1               OUTS  1           TURN OFF SOUND
031A FD18 57               LR    SCAD,A      AND CLEAR SCORE ADD
031B FD19 1C               POP               AND RETURN
031C FD1A 65        CENB   LISU  5
031D FD1B 68               LISL  0
031E FD1C 3C               DS    S
031F FD1D 94 0C            BNZ   CEN1        TIME FOR COLOR CHANGE?
0320 FD1F 78               LIS   H'8'        YES. RESET TIMER FIRST
0321 FD20 5C               LR    S,A
0322 FD21 2A 08 18         DCI   H'818'
0323 FD24 0E               LR    Q,DC        SAVE ADDRESS IN Q
0324 FD25 20 40            LI    H'40'
0325 FD27 88               AM
0326 FD28 0F               LR    DC,Q
0327 FD29 17               ST                AND RESET COLOR
0328 FD2A 1C        CEN1   POP
0329                       END               END TO KEEP ASSEMBLER HAPPY
00
```

```
ACT  FB29  CEN1 FD2A  CENB FD1A  CLER F800  CLR1 F808
CLRS F97E  CNG1 F991  CNGB F996  CNGC F98B  DSPY F9D7
EDPT FA6A  EXC1 FBF4  EXC2 FBF1  F1   FCB4  F2   FCB7
FILL F9BC  FL1  F9C0  FL2  F9CE  FL3  F9D1  FLSH FCAA
HL   000B  HU   000A  INIT F80D  INTS F817  LOOP F917
LP1  F93A  LP2  F94B  LP3  F94F  PACK F99D  PAD2 FB49
PAD3 FB64  PAD4 FB68  PAD5 FB6D  PADC FB3E  PPUP FB14
PREP FB9B  PSTA 0006  RSET FCBD  RST1 FCC0  RST2 FCD9
S2   FC50  S3   FC54  SCAD 0007  SCH1 FC2C  SCHD FC0D
SCND FC49  SCOR 0005  SET  FC4A  SN1  FD05  SN2  FD0D
SN3  FD10  SOND FD00  SORT FBAC  SRT1 FBB0  SRT2 FBB6
SRT3 FBDF  SRT4 FBE2  SRT5 FC06  SRTD FBF0  ST0  FB75
ST1  FB7E  STA0 FB1D  STA1 FB22  STA2 FB25  SWIT FBFD
SYNC F837  TBC1 FC65  TBC2 FC6D  TBC3 FC7C  TBC4 FC80
TBC5 FC8E  TBC6 FC96  TBC7 FC9A  TBCL FC5A  TEMP 0009
```

```
TMP2   000A   TMP3  000B   UD    F9F5   UD0   F9F2   UD1   FA00
UD10   FA88   UD11  FA9D   UD12  FAA7   UD13  FAB5   UD14  FAC8
UD15   FAD6   UD2   FA06   UD3   FA12   UD4   FA19   UD5   FA29
UD6    FA33   UD7   FA38   UD8   FA3C   UD9   FA44   UDA   FA4F
UDB    FA50   UDC   FA5F   UDCK  FA6F   UDEP  FAE1   UDL0  FA93
UDL1   FAAB   UDP   FAE6   UDP2  FB05   UDP3  FB0A   UDP4  FB0E
UDPD   FB8F   UDPL  FB87   UDPR  FB8C   UDRT  FA5E   UPAK  FB15
UPD1   F9AF   UPD2  F9B5   UDPX  F9A7   VX    0001   VXCH  FCA5
VY     0003   VYCH  FC9E   VYP   0004   X     0000   Y     0002

PASS 2
```

While the invention has been described in detail in connection with a preferred embodiment thereof, it will be apparent to those skilled in the art that many changes or modifications can be made without departing from the spirit of the invention. It is therefore intended that the coverage afforded be limited only by the language of the claims and its equivalent.

I claim:

1. A method of producing sequential frame displays of object images and background on a display surface area which is scanned by a scanning system to produce each of said frame displays, comprising the steps of:
   storing at predetermined locations sets of information respectively defining a plurality of spatial display segments which individually at least partially define an object image associated therewith it may be desired be displayed at some location on said display area during one or more of said sequential frame displays;
   tracking the scan by said scanning system which produces each of said frame displays;
   responding to said step of tracking indicating that said scanning system is approaching a desired spatial location for a selected spatial segment in one of said frame displays by directing delivery to said scanning system at such time of control signals conforming to the stored information set defining said selected spatial display segment;
   calculating for each of said frame displays the time-distance between spatial display segments which are to be sequentially displayed thereon; and
   providing to said scanning system background control signals directing said scanning system to produce said background display between spatial display segments for said calculated time-distance.

2. Apparatus for producing sequential frame displays of object images for a display surface area which is scanned by a scanning system to produce each of said frame displays comprising:
   memory means to store at predetermined locations sets of information respectively defining a plurality of spatial display segments which individually at least partially define an object image associated therewith it may be desired be displayed during one or more of said sequential frame displays;
   means to convert spatial display segment information to corresponding control signals for said scanning system; and
   means to discharge to said converting means information defining spatial display segments selected to appear in a specified frame display, at a rate correlated with the rate at which said scanning system scans said display surface area to produce said specified frame display, which means accepts delivery of said information from said predetermined locations of said memory means at a rate which is not correlated with the rate at which said scanning system scans said display surface area.

3. Apparatus according to claim 2 wherein said information discharging means includes a first in-first out buffer.

4. Apparatus for producing sequential frame displays for a display surface area which is scanned by a scanning system to produce each of said frame displays comprising:
   memory means to store sets of information respectively defining a plurality of spatial display segments which individually at least partially define an object image associated therewith it may be desired to be displayed during one or more of said sequential frame displays;
   means to provide information defining a display surface area background for object images to be displayed during a specified frame display;
   means to convert said spatial display segment information and said background information to corresponding control signals for said scanning system;
   means to track the scan by said scanning system which produces said specified frame display;
   means responsive to said scan tracking means indicating that said scanning system is approaching a desired spatial positioning for a selected spatial segment by directing said memory means storing the information set defining said spatial display segment to deliver information defining said segment to said information converting means;
   means to calculate for said scan producing said specified frame display the time-distance between spatial display segments which are to be sequentially displayed in said specified frame display; and
   means responsive to calculation of such a time-distance by directing said background information providing means to deliver to said converting means information defining said background for the time-distance so calculated.

5. Apparatus according to claim 2 further including means connected to the output of said information discharging means for storing information indicating modifications to color or intensity information emanating from said information discharging means.

6. Apparatus according to claim 2 further including memory means to store information defining a size multiplication of a spatial display segment, which means communicates with the output of said information discharging means for delivering said multiplication information thereto.

7. Apparatus according to claim 2 further including means to track the scan by said scanning system which produces each of said frame displays, and memory means communicating with said scan tracking means for storing information indicative of a location being scanned when a freeze command signal is received.

8. Apparatus for producing sequential frame displays for display surface area which is scanned by a scanning system to produce each of said frame displays comprising:

means to store at predetermined locations sets of information respectively defining a plurality of spatial display segments which individually at least partially define an object image associated therewith it may be desired be displayed at some location on said display area during one or more of said sequential frame displays;

associative memory means to list at a location separate and apart from the locations at which said sets of information are stored, the spatial display segments selected to be displayed in a specified frame display, the spatial location desired for each therein, and a color or intensity attribute selected for the object image of each of said specified spatial display segments;

means to track the scan by said scanning system which produces each of said frame displays;

means responsive to said tracking means indicating that said scanning system is approaching a desired spatial location for a selected spatial segment in said specified frame display by directing delivery to said scanning system at such time of control signals conforming both to the stored information sets defining said selected spatial display segment and to the selected color or intensity attribute of the object image thereof; and means to update as required for a succeeding frame display both the sets of information defining spatial display segments to be displayed and the selected intensity or color attributes thereof.

9. Apparatus according to claim 2 further including first offset memory means to store information indicative of a location in the Y direction on said display surface area at which the first line to be scanned is to be positioned during a specified frame display, and means responsive to said first offset memory means containing information indicative of a first line location different than the normal first line location by adjusting said first line location to correspond to the location indicated in said first offset memory means.

10. Apparatus according to claim 9 further including second offset memory means to store information indicative of a location in the X direction on said display surface area at which all of said lines to be scanned are to first appear, and means responsive to said offset memory means containing information indicative of a starting location for said lines different than the normal line starting location in the X direction by adjusting said starting location to the location indicated in said second offset memory means.

11. Apparatus according to claim 8 further including means to provide information defining a display surface area background for object images to be displayed during a specified frame display; wherein said display surface area is a display screen of a television receiver and said scanning system is the raster scanning system therefor; means are included for generating the timing and synchronization signals required to produce a composite video signal for the scanning system of said television receiver; each of said sets of information defining a spatial display segment includes indicia defining background for an object image also defined by said set of information; and said delivery means is responsive to said background defining information in each of said information sets by directing said background information providing means to provide information defining background to said converting means for conversion of the same to corresponding control signals for said scanning system.

12. Apparatus according to claim 11 wherein said scan tracking means includes a line counter which indicates the line being scanned by said scanning system at any given time, and further includes means for storing information setting forth a scan line to be compared with said line counter for generation of an interrupt signal.

13. A method of producing sequential frame displays of object images for a display surface area which is scanned by a scanning system to produce each of said frame displays, comprising the steps of:

storing at predetermined locations sets of information respectively defining a plurality of spatial display segments which individually at least partially define an object image associated therewith it may be desired be displayed at some location on said display area during one or more of said sequential frame displays;

providing means to convert spatial display segment information to corresponding control signals for said scanning system;

delivering to information discharge means information extracted from said predetermined locations defining the set or sets of spatial display segments selected to appear in a specified frame display in the order in which such information is required by said scanning system to produce said spatial display segments on said display surface during said frame display; and discharging said information from said discharge means to said converting means at a rate correlated with the rate at which said scanning system scans said display surface area to produce each of said frame displays.

14. A method according to claim 13 further including the steps of tracking the scan by said scanning system which produces said specified frame display; and responding to said step of tracking indicating that said scanning system is approaching a desired spatial location for a selected spatial segment by directing delivery of the stored information set defining said spatial display segment for discharge of the information therein defining object images at said rate.

15. A method according to claim 13 wherein said means provided to convert said spatial display segment information to corresponding control signals for said scanning system is also capable of converting information defining a display surface area background to control signals for said scanning system to produce background for said display surface area, and further including the steps of:

providing information defining a background to be produced by said scanning system at locations at which object images are not to be displayed during a specified frame display;

calculating for each of said frame displays the time-distance between spatial display segments which are to be sequentially displayed thereon; and delivering background defining information so calculated to said converting means between the information delivered thereto defining the spatial display segments for which the time-distance of such background was calculated; and discharging information defining said background to said converting means for the production by said converting means of background control signals for said scanning system for the time-distance so calculated between said spatial display segments.

16. A method of producing sequential frame displays of object images for a display surface area which is scanned by a scanning system to produce each of said frame displays, comprising the steps of:

storing at predetermined locations sets of information respectively defining a plurality of spatial display segments which individually at least partially define an object image associated therewith it may be desired be displayed at some location on said display area during one or more of said sequential frame displays;

specifying which of said spatial display segments are to be displayed during a selected frame display;

specifying for each of said specified spatial display segments, at a location separate and apart from the location at which said sets of information are stored, a color or intensity attribute selected for the object image of said spatial display segment;

tracking the scan by said scanning system which produces each of said frame displays;

responding to said step of tracking indicating that said scanning system is approaching the desired spatial location for a specified spatial segment in said selected frame display by directing delivery to said scanning system at such time of control signals conforming both to the stored information sets defining said specified spatial display segments and to the specified color or intensity attribute of the object image thereof; and updating as required for a succeeding frame display both the sets of information defining spatial display segments to be displayed and the selected intensity or color attributes thereof.

17. Apparatus according to claim 4 wherein said means to direct delivery of information defining said segment to said information converting means includes means to discharge to said converting means information defining spatial display segments selected to appear in a specified frame display at a rate correlated with the rate at which said scanning system scans said display surface area to produce said specified frame display, which means accepts delivery of said information from said predetermined locations of said memory means at a rate which is not correlated with the rate at which said scanning system scans said display surface area.

18. Apparatus according either to claim 4 further including associative memory means to list at a location separate and apart from the locations at which said sets of information are stored, the spatial display segments selected to be displayed in a specified frame display, the spatial location desired for each therein, and a color or intensity attribute selected for the object image of each of said specified spatial display segments.

19. Apparatus according to claim 2 further including means to provide information defining a display surface area background for object images to be displayed during said specified frame display; and wherein each of said sets of information defining a spatial display segment includes information defining background for an object image also defined by said set of information, and said discharging means is responsive to said background defining information in each of said information sets by directing said background information providing means to provide information defining background to said converting means for conversion of the same to corresponding control signals for said scanning system.

20. Apparatus according to claim 2 wherein said display surface area is a display screen of a television receiver and said scanning system is a scanning system therefor; and further including means for generating the timing and synchronization signals required to produce a composite video signal for the scanning system of said television receiver, and means for superimposing a radio frequency carrier signal on said composite video signal to condition the same for application to the antenna input of said television receiver.

21. Apparatus according to claim 8 further including means to communicate with said approach responsive means for selectively directing the same to repeat a direction to said memory means to deliver an information set defining a selected display segment to said information discharging means, whereby said scanning system produces said selected segment a plurality of times adjacent one another on said display surface area.

22. Apparatus according to claim 17 further including associative memory means to list at a location separate and apart from the locations at which said sets of information are stored, the spatial display segments selected to be displayed in a specified frame display, the spatial location desired for each therein, and a color or intensity attribute selected for the object image of each of said specified spatial display segments.

* * * * *